United States Patent [19]
Kouno et al.

[11] Patent Number: 5,818,560
[45] Date of Patent: Oct. 6, 1998

[54] LIQUID CRYSTAL DISPLAY AND METHOD OF PREPARING THE SAME

[75] Inventors: Hiroaki Kouno, Daito; Yoshihiro Furuta, Kobe; Eiji Tamaoka, Kobe; Kazuhiro Inoue, Kobe, all of Japan

[73] Assignee: Sanyo Electric Co., Ltd., Osaka, Japan

[21] Appl. No.: 563,584

[22] Filed: Nov. 28, 1995

[30] Foreign Application Priority Data

Nov. 29, 1994 [JP] Japan .................................. 6-294508
Nov. 2, 1995 [JP] Japan .................................. 7-286009

[51] Int. Cl.⁶ .................................................. G02F 1/1337
[52] U.S. Cl. ........................................... 349/129; 349/124
[58] Field of Search .................................. 349/129, 124, 349/134, 135

[56] References Cited

U.S. PATENT DOCUMENTS

| | | | |
|---|---|---|---|
| 5,084,557 | 1/1992 | Murata et al. | 349/136 |
| 5,249,070 | 9/1993 | Takano | 349/136 |
| 5,280,375 | 1/1994 | Tsuda et al. | 349/129 |
| 5,473,455 | 12/1995 | Koike et al. | 349/129 |
| 5,623,354 | 4/1997 | Lien et al. | 349/124 |
| 5,654,780 | 8/1997 | Hasegawa et al. | 349/136 |
| 5,666,178 | 9/1997 | Hirata et al. | 349/129 |
| 5,686,558 | 11/1997 | Kitamura et al. | 349/123 |

FOREIGN PATENT DOCUMENTS

| | | |
|---|---|---|
| 06332009 | 12/1994 | Japan . |
| 07191313 | 7/1995 | Japan . |
| 07199193 | 8/1995 | Japan . |
| 7-230092 | 8/1995 | Japan . |

OTHER PUBLICATIONS

Article entitled: "A Complementary TN LCD with Wide-–Viewing–Angle Grayscale" by Takatori et al., Japan Display 92, pp. 591 –594.

Article: 41.5: *Late–News Paper* : A Full–Color TFT–LCD with a Domain–Divided Twisted–Nematic Structure; by Koike et al.; SID 92 Digest, pp. 798 –801.

*Primary Examiner*—William L. Sikes
*Assistant Examiner*—Toan Ton
*Attorney, Agent, or Firm*—W. F. Fasse; W. G. Fasse

[57] ABSTRACT

A liquid crystal display comprising a liquid crystal and a polyimide alignment layer for orienting the liquid crystal, wherein the polyimide alignment layer has a plurality of regions which are at different imidiation ratios, whereby liquid crystal portions corresponding to the respective regions are oriented at different pretilt angles which are responsive to the imidiation ratios.

12 Claims, 27 Drawing Sheets

LIQUID CRYSTAL DISPLAY AND METHOD OF PREPARING THE SAME

BACKGROUND OF THE INVENTION

1. Field of the Invention

The present invention relates to a liquid crystal display and a method of preparing the same, and more particularly, it relates to the structure of a liquid crystal display which is improved in viewing angle by changing pretilt angles of liquid crystal portions, and a method of preparing the same.

2. Description of the Background Art

In general, various liquid crystal displays such as TN and STN liquid crystal displays and a liquid crystal display employing a ferroelectric liquid crystal are known in the art, while simple and active matrix type liquid crystal displays are also known in relation to systems of driving the liquid crystal displays.

In each of such liquid crystal displays, the liquid crystal is generally held between a pair of substrates, while alignment layers for orienting the liquid crystal are provided inside the substrates. Due to the alignment layers, the liquid crystal molecules are oriented to have a constant pretilt angle.

In the conventional liquid crystal display, the liquid crystal molecules are set to be substantially at the same pretilt angle over the entire display region. Therefore, angles allowing clear observation of the display contents are so limited that the so-called viewing angles are narrow.

SUMMARY OF THE INVENTION

An object of the present invention is to provide a liquid crystal display which can improve the viewing angle property and a method of preparing the same.

A liquid crystal display according to a first aspect of the present invention comprises a liquid crystal, and a polyimide alignment layer for orienting the liquid crystal. The polyimide alignment layer has a plurality of regions which are at different imidiation ratios, thereby orienting portions of the liquid crystal corresponding to the respective regions at different pretilt angles which are responsive to the imidiation ratios.

In the present application, an imidiation ratio means a ratio of imide groups to the total of imide groups and groups being able to convert to imide groups.

In the first aspect, the plurality of regions of the polyimide alignment layer which are at different imidiation ratios are preferably formed in each pixel.

According to the first aspect, the polyimide alignment layer has regions which are at different imidiation ratios, thereby varying the pretilt angles of the liquid crystal with the imidiation ratios. In the liquid crystal display, mutual dependency is recognized between pretilt angles of liquid crystal molecules and a threshold voltage for driving the liquid crystal. Therefore, it is possible to vary threshold voltages for driving the liquid crystal by varying the pretilt angles, thereby changing the viewing angles. Thus, regions having different viewing angles can be arranged over the entire display region. It is possible to form regions having different preferential viewing angles in one pixel by forming a plurality of regions having different imidiation ratios in this pixel.

A method according to a second aspect of the present invention is a method which can prepare the liquid crystal display according to the aforementioned first aspect of the present invention. The method according to the second aspect, which is a method of preparing a liquid crystal display having a polyimide alignment layer for orienting a liquid crystal, comprises the steps of forming the polyimide alignment layer, prebaking the polyimide alignment layer and irradiating the polyimide alignment layer with a laser beam for changing the imidiation ratio of the irradiated region.

The polyimide alignment layer is generally prepared from polyamic acid or soluble polyimide as starting material. The polyamic acid is a compound which is converted to a polyimide compound by heating and increasing its imidiation ratio. The soluble polyimide is a polyimide compound which is not partially imidized, and therefore soluble in specific solvents. Therefore, the imidiation ratio of the irradiated region can be changed by preparing the polyimide alignment layer from such polyamic acid or soluble polyimide and irradiating this polyimide alignment layer with a laser beam. Thus, it is possible to form a plurality of regions having different imidiation ratios in the polyimide alignment layer by irradiating only a specific region with the laser beam and changing the imidiation ratio of the irradiated region.

The polyamic acid employed in the present invention originally has a low imidiation ratio (not more than about 50%), which can be therefore remarkably changed. The soluble polyimide employed in the present invention originally has a high imidiation ratio (more than about 50%) as compared with the polyamic acid, whereby a polyimide alignment layer having a high imidiation ratio can be prepared from the soluble polyimide with small heat treatment.

According to the present invention, the prebaking temperature is preferably 50° to 150° C., and more preferably 100° to 150° C. Due to such prebaking, it is possible to make the polyimide alignment layer reach a prescribed imidiation ratio.

The prebaking may be performed by irradiation with a laser beam.

Due to such irradiation with a laser beam, the prebaking can be performed in continuation with the laser application for changing the imidiation ratio after the prebaking.

It is possible to change the imidiation ratio by properly selecting the wavelength or energy density of the employed laser beam for increasing or reducing the imidiation ratio.

The wavelength of the laser beam which is applied for increasing the imidiation ratio is preferably at least 400 nm. If the wavelength is smaller than 400 nm, polymer bonding such as imide bonding may be cut in the polyimide alignment layer, or the alignment layer itself may be broken. Energy density is preferably 0.01 to 1 J/cm$^2$, and more preferably 0.01 to 0.1 J/cm$^2$.

The wavelength of the laser beam which is applied for reducing the imidiation ratio is preferably 300 to 400 nm. If the wavelength is less than 300 nm, the alignment layer itself may be easy to break and its performance for orienting the liquid crystal may be reduced. If the wavelength exceeds 400 nm, on the other hand, bonding such as imide bonding in the alignment layer may be so insufficiently cut that the imidiation ratio cannot be sufficiently reduced.

Energy density is preferably 1 to 90 mJ/cm$^2$, and more preferably 30 to 70 mJ/cm$^2$.

A method according to a third aspect of the present invention is a method of preparing a liquid crystal display having a polyimide alignment layer for orienting a liquid crystal, which comprises the steps of forming a film of polyamic acid serving as a precursor for the polyimide alignment layer, imidizing the film of polyamic acid by prebaking, and partially irradiating the imidized film with a laser beam for increasing the imidiation ratio of the irradiated region.

The temperature of the heat treatment for imidizing polyamic acid is preferably about 100° to 150° C.

The wavelength of the laser beam which is applied for increasing the imidiation ratio is preferably at least 400 nm. If the wavelength of the laser beam is shorter than 400 nm, bonding in the film may be cut or the film may be broken. Energy density is preferably 0.01 to 1 $J/cm^2$, and more preferably 0.01 to 0.1 $J/cm^2$.

The heat treatment for the film of polyamic acid is not particularly restricted but may be carried out by irradiation with a laser beam, for example.

A method according to a fourth aspect of the present invention is a method of preparing a liquid crystal display having a polyimide alignment layer for orienting a liquid crystal, which comprises the steps of forming the polyimide alignment layer, and partially irradiating the polyimide alignment layer with a laser beam for increasing the imidiation ratio of the irradiated region.

The polyimide alignment layer which is employed in the fourth aspect can be prepared from polyamic acid or soluble polyimide, similarly to the second aspect. Therefore, the polyimide alignment layer may be prebaked after formation, to be thereafter irradiated with a laser beam so that the imidiation ratio of the irradiated region is reduced.

A liquid crystal display according to a fifth aspect of the present invention comprises a liquid crystal and a photosensitive polymer alignment layer for orienting the liquid crystal. The photosensitive polymer alignment layer has a plurality regions which are at different degrees of polymerization, whereby portions of the liquid crystal corresponding to the respective regions are oriented at different pretilt angles responsive to the degrees of polymerization.

The photosensitive polymer alignment layer can be prepared from a negative or positive photosensitive polymer which is employed for photolithography. It is possible to orient the liquid crystal at different pretilt angles which are responsive to the degrees of polymerization by varying the degrees of polymerization of the photosensitive polymer alignment layer for forming regions having different pretilt angles, thereby improving the viewing angles.

According to the fifth aspect, it is possible to orient the liquid crystal at different pretilt angles, by employing a photosensitive polymer alignment layer as the alignment layer and making the degrees of polymerization of the photosensitive polymer alignment layer differ from each other without changing the structure of any pixel of the liquid crystal display. Thus, the viewing angles can be more simply improved as compared with the conventional method of dividing each pixel etc.

A method according to a sixth aspect of the present invention is a method which can prepare the liquid crystal display according to the fifth aspect of the present invention, and comprises the steps of forming a photosensitive polymer alignment layer, and irradiating the photosensitive polymer alignment layer with ultraviolet light for changing the degree of polymerization of the irradiated region.

It is possible to form a plurality of regions having different degrees of polymerization in the photosensitive polymer alignment layer by partially irradiating the same with ultraviolet light and changing the degree of polymerization of only the irradiated region. Such a plurality of regions having different degrees of polymerization are preferably formed in each pixel.

According to the sixth aspect, the photosensitive polymer alignment layer is preferably developed after the same is irradiated with ultraviolet light. Due to such development, it is possible to vary the surface shape such as surface roughness with the degrees of polymerization, thereby forming the regions having different pretilt angles.

A liquid crystal display according to a seventh aspect of the present invention comprises a liquid crystal and an alignment layer for orienting the liquid crystal, and the surface of the alignment layer is provided with a texture shape, thereby orienting the liquid crystal at different pretilt angles which are responsive to the texture shape. The pretilt angles of the liquid crystal are influenced also by the texture shape of the alignment layer.

The surface of the alignment layer can be provided with the texture shape by a method of dispersing fine grains in the alignment layer. According to this method, the texture shape is formed on the surface of the alignment layer along the shapes of the fine grains. The fine grains may be substantially homogeneous in grain size, or those of different grain sizes may be mixed with each other to attain wide grain size distribution. According to this method, it is possible to readily change the pretilt angles by changing the grain sizes of the fine grains which are added into the alignment layer, without changing the pixel structure of the liquid crystal display.

Alternatively, a porous alignment layer may be so formed that its surface is provided with a texture. In this case, liquid crystals may permeate into pores which are formed in the surface which is contact with the liquid crystal.

On the other hand, an underlayer having a texture shape on its surface may further alternatively be provided under the alignment layer, so that a texture shape reflecting the surface shape of the underlayer is provided on the surface of the alignment layer.

The underlayer may be formed by a substrate surface, or an auxiliary capacitive electrode, an insulating film or a transparent electrode which is formed on the substrate.

The texture shape formed on the surface of the alignment layer may have a tapered convex portion. When the texture shape of the underlayer is reflected on the surface of the alignment layer, the texture of the underlayer may have a tapered convex portion, so that the texture shape provided on the surface of the alignment layer also has a tapered convex portion.

A liquid crystal display according to an eighth aspect of the present invention comprises a liquid crystal and an alignment layer for orienting the liquid crystal, and a plurality of groove regions are formed on the surface of the alignment layer by arranging grooves which are different at least either in groove shape or groove formation direction from each other, whereby portions of the liquid crystals corresponding to the respective groove regions are oriented at different pretilt angles.

According to the eighth aspect, the groove shapes or the groove formation directions are thus varied, thereby varying the pretilt angles of the liquid crystal.

According to the eighth aspect, the liquid crystal portions corresponding to the respective groove regions are oriented at different pretilt angles along the shapes of the grooves which are formed on the surface of the alignment layer, i.e., the depths, widths and pitches of the grooves, or the formation directions of the grooves.

Also according to the eighth aspect, an underlayer which is provided under the alignment layer can be provided with groove regions, thereby forming groove regions reflecting the shapes of those of the underlayer on the surface of the alignment layer.

The underlayer may be formed by a substrate surface, or an auxiliary capacitive electrode, an insulating film or a transparent electrode, similarly to the above.

According to the present invention, the imidiation ratio can be determined in accordance with the following expression, by measuring the IR spectrum:

$(\Lambda_{1380}/\Lambda_{1500})_T/(\Lambda_{1380}/\Lambda_{1500})_{295° C.} \times 100$ (%)

where $\Lambda_{1380}$ represents the amount of absorption of the IR spectrum at 1380 cm$^{-1}$, corresponding to absorption of imide rings, $\Lambda_{1500}$ represents the amount of absorption of the IR spectrum at 1500 cm$^{-1}$, corresponding to absorption of benzene rings, $(\Lambda_{1380}/\Lambda_{1500})_{295° C.}$ represents the ratio of the amounts of absorption of the IR spectrum after heat treatment of polyamic acid or soluble polyimide at 295° C., and $(\Lambda_{1380}/\Lambda_{1500})_T$ represents the ratio of the amounts of absorption of the IR spectrum of the compound which is the object of the measurement.

In the aforementioned calculation formula, therefore, the imidiation ratio is calculated assuming that the level of 100% is attained by heat treatment at 295° C.

The present invention further includes the following subject matters:

(1) A liquid crystal display having an alignment layer for orienting a liquid crystal, wherein
   the pretilt angle in at least one liquid crystal region is different from that of the remaining crystal region among a plurality of liquid crystal regions on the alignment layer.

(2) The liquid crystal display described in the above item (1), wherein
   the said alignment layer is formed by a polyimide alignment layer having a plurality of regions which are at different imidiation ratios, and
   the said plurality of liquid crystal regions having different pretilt angles are formed on the plurality of regions which are at different imidiation ratios in correspondence thereto.

(3) The liquid crystal display described in the above item (2), wherein
   at least one of a pair of the said alignment layers which are oppositely arranged through a liquid crystal layer has the said plurality of regions which are at different imidiation ratios.

(4) The liquid crystal display described in the above item (3), wherein
   the pair of the said alignment layers are provided with plural regions which are at different imidiation ratios on symmetrical positions through the said liquid crystal layer.

(5) A method of preparing a liquid crystal display unit having an alignment layer for orienting a liquid crystal, which is characterized in that an imidiation ratio is partially changed after formation of a polyimide alignment layer.

(6) The method of preparing a liquid crystal display described in the above item (5), wherein the imidiation ratio is partially changed by irradiating the surface of the said polyimide alignment layer with a laser beam.

(7) The method of preparing a liquid crystal display described in the above item (6), wherein the said laser beam is applied in laser intensity not cutting polymer bonding of the said polyimide alignment layer, thereby partially increasing the imidiation ratio.

(8) The method of preparing a liquid crystal display described in the above item (6), wherein the said laser beam is applied in laser intensity capable of cutting polymer bonding of the said polyimide alignment layer, thereby reducing the imidiation ratio.

(9) The liquid crystal display described in the above item (1), wherein
   the said alignment layer is formed by a photosensitive polymer alignment layer having a plurality of regions which are at different degrees of polymerization, and
   the said plurality of liquid crystal regions having different pretilt angles are formed on the plurality of regions of the said alignment layer which are at different degrees of polymerization in correspondence thereto.

(10) A method of preparing a liquid crystal display having an alignment layer for orienting a liquid crystal, characterized in that a photosensitive polymer alignment layer is formed as the said alignment layer, and thereafter the said photosensitive polymer alignment layer is irradiated with ultraviolet light for changing the degree of polymerization of the said photosensitive polymer alignment layer by selectively photosensitizing the same.

(11) The method of preparing a liquid crystal display described in the above item (10), wherein the said photosensitive polymer alignment layer which is selectively provided with regions having different degrees of polymerization is so developed that regions having different surface shapes are formed on the surface of the said photosensitive polymer alignment layer.

(12) The liquid crystal display described in the above item (1), wherein the said alignment layer is provided with a texture on its surface which is in contact with the said liquid crystal, and
   the said liquid crystal regions arranged on the texture surface of the said alignment layer have different pretilt angles in correspondence to the shape of the said texture surface.

(13) The liquid crystal display described in the above item (12), wherein
   the said alignment layer is formed by a porous alignment layer.

(14) The liquid crystal display described in the above item (13), wherein the said alignment layer has viscosity.

(15) The liquid crystal display described in the above item (13) or (14), wherein molecules of the said liquid crystal permeate into the interior of pores formed in the surface of the said alignment layer which is in contact with the said liquid crystal.

(16) The liquid crystal display described in the above item (12), wherein fine grains are dispersed in the said alignment layer, and
   the texture is formed on the surface of the said alignment layer along the shapes of the dispersed said fine grains.

(17) The liquid crystal display described in the above item (16), wherein the said fine grains dispersed in the said alignment layer have substantially homogeneous grain sizes.

(18) The liquid crystal display described in the above item (16), wherein the said fine grains dispersed in the said alignment layer have a plurality of different grain sizes.

(19) The liquid crystal display described in the above item (12), comprising a light-transmittable substrate, and a transparent electrode which is formed every pixel region on the surface of the said light-transmittable substrate, wherein the said transparent electrode is formed in a surface shape having a tapered convex portion, and the surface of the said alignment layer covering the surface of the said transparent electrode is formed in a shape having a tapered convex portion reflecting the surface shape of the said transparent electrode.

(20) The liquid crystal display described in the above item (12), having a light-transmittable substrate, and an auxiliary capacitive electrode, an insulating film and a transparent electrode which are successively stacked every pixel region on the surface of the said light-transmittable substrate, wherein the surface of any one layer of the said light-transmittable substrate, the said auxiliary capacitive electrode, the said insulating film and the said transparent electrode is formed in a texture shape having a tapered convex portion, and the surface of the alignment layer covering the said transparent electrode is formed in a texture shape having a tapered convex portion reflecting the surface shape of the said any one layer.

(21) The liquid crystal display described in any of the above items (2) to (4), (9) and (12) to (20), wherein the surface of the said alignment layer is subjected to rubbing treatment.

(22) The liquid crystal display described in the above item (1), wherein a plurality of groove regions are formed on the surface of the said alignment layer by arranging a plurality of grooves which are different at least either in groove depth or groove direction from each other, and a plurality of regions of the said liquid crystal having different pretilt angles are formed on the said plurality of groove regions in correspondence thereto.

(23) The liquid crystal display described in the above item (22), comprising a light-transmittable substrate, and a transparent electrode which is formed every pixel region on the surface of the said light-transmittable substrate, wherein the surface of the said transparent electrode is provided with a groove region by arranging a plurality of grooves which are different at least in groove depth or groove direction from each other, and the surface of the said alignment layer covering the surface of the said transparent electrode is formed in a groove shape reflecting the surface shape of the transparent electrode.

(24) The liquid crystal display described in the above item (22), having a light-transmittable substrate, and an auxiliary capacitive electrode, an insulating film and a transparent electrode which are successively stacked every pixel region on the surface of the said light-transmittable substrate, wherein the surface of any one layer of the said transparent substrate, the said auxiliary capacitive electrode, the said insulating film and the said transparent electrode is provided with a groove region formed by arranging a plurality of grooves which are different at least either in groove depth or groove direction from each other, and the surface of the alignment layer covering the said transparent electrode is provided with a groove shape reflecting the surface shape of the said any one layer.

According to the first aspect of the present invention, the liquid crystal is oriented at different pretilt angles by changing the imidiation ratio of the polyimide alignment layer. Therefore, a plurality of regions having different preferential viewing angles can be formed on a display region, the viewing angles can be widened, and the viewing angle property can be improved.

According to each of the second, third and fourth aspects of the present invention, the imidiation ratio of the polyimide alignment layer is changed by irradiating the same with the laser beam, thereby orienting the liquid crystal at different pretilt angles. Thus, the pretilt angles can be varied by a simple method in a fine region.

According to each of the fifth and sixth aspects of the present invention, a plurality of regions having different degrees of polymerization are formed in the photosensitive polymer alignment layer, thereby orienting the liquid crystal at different pretilt angles. Therefore, the viewing angle property can be improved similarly to the above.

According to the seventh aspect of the present invention, the texture shape is formed on the surface of the alignment layer, thereby orienting the liquid crystal at different pretilt angles. Therefore, the viewing angle property can be improved similarly to the above.

According to the eighth aspect of the present invention, the surface of the alignment layer is provided with a plurality of groove regions consisting of grooves which are different at least either in groove shape or in groove formation direction from each other, thereby orienting the liquid crystal at different pretilt angles. Therefore, the viewing angle property can be improved similarly to the above.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
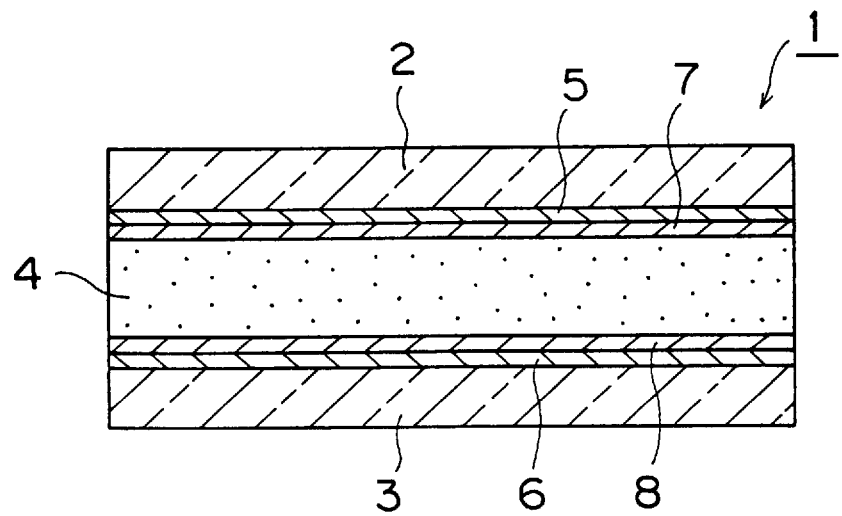
FIG. 1 is a sectional view showing an exemplary structure of a liquid crystal display according to the present invention.

FIG. 1 is a sectional view showing an exemplary structure of a display part of a liquid crystal display 1. Referring to FIG. 1, a liquid crystal 4 is injected in the liquid crystal display 1 between substrates 2 and 3 consisting of a transparent material such as glass. Transparent conductor films 5 and 6 are provided on surfaces of the substrates 2 and 3 which are in contact with the liquid crystal 4, for serving as electrodes for applying a voltage to the liquid crystal 4. Alignment layers 7 and 8 for orienting the liquid crystal 4 are formed on the transparent conductor films 5 and 6 respectively. The transparent conductor films 5 and 6 are made of ITO (indium tin oxide), for example. On the other hand, the alignment layers 7 and 8 are made of synthetic resin such as polyimide.

In the conventional liquid crystal display 1, the alignment layers 7 and 8 are homogeneously formed along the overall surface of the display region, and hence pretilt angles of liquid crystal molecules are set to be identical to each other along the overall display region.

According to the first to fourth aspects of the present invention, each alignment layer is formed by a polyimide alignment layer, which is provided with a plurality of regions having different imidiation ratios. Thus, liquid crystal parts corresponding to the respective regions are oriented at pretilt angles which are responsive to the imidiation ratios.

According to the fifth and sixth aspects of the present invention, each alignment layer is formed by a photosensitive polymer alignment layer, which is provided with a plurality of regions having different degrees of polymerization. Thus, liquid crystal parts corresponding to the respective regions are oriented at different pretilt angles which are responsive to the degrees of polymerization.

According to the seventh aspect of the present invention, a texture shape is formed on the surface of each alignment layer, thereby orienting the liquid crystal at different pretilt angles which are responsive to the texture shape.

According to the eighth aspect of the present invention, the surface of each alignment layer is provided with a plurality of groove regions by arranging a plurality of grooves which are different at least either in groove shape or in groove formation direction from each other. Thus, liquid crystal parts corresponding to the respective groove regions are oriented at different pretilt angles.

Embodiments according to the aforementioned aspects of the present invention are now described.

First, embodiments according to the first to fourth aspects of the present invention are described.

Figure 2:
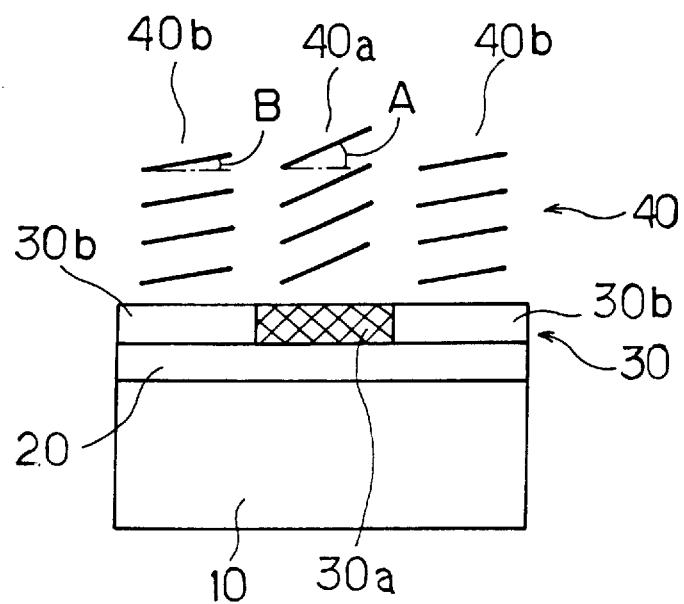
FIG. 2 is a sectional view showing a principal part of a liquid crystal display of an embodiment according to a first aspect of the present invention.

FIG. 2 is a sectional view showing a principal part of a liquid crystal display of an embodiment according to the first aspect of the present invention. Referring to FIG. 2, the liquid crystal display comprises a light-transmittable substrate 10 which is made of glass or light-transmittable synthetic resin, a conductor film 20 which is formed on the surface of the light-transmittable substrate 10, and an alignment layer 30 which is further formed on its surface. A liquid crystal 40 is injected on the alignment layer 30. A structure (not shown) which is identical to that formed by the alignment layer 30, the conductor film 20 and the light-transmittable substrate 10 is symmetrically provided on the upper surface of the liquid crystal 40.

The conductor film 20, serving as an electrode for applying a voltage to the liquid crystal 40, is made of a transparent conductive material such as ITO, for example. The alignment layer 30 is made of polyimide resin, and its surface is rubbed. The alignment layer 30 of polyimide has regions 30a and 30b which are different in imidiation ratio from each other. Due to such different imidiation ratios of the polyimide alignment layer 30, the liquid crystal 40 which is injected on its surface has different pretilt angles in an initial orientation state. For example, a pretilt angle A of a portion of the liquid crystal 40 which is positioned on the region 30a having a higher imidiation ratio is larger than a pretilt angle B of another portion of the liquid crystal 40 which is positioned on the region 30b having a lower imidiation ratio.

Methods of preparing liquid crystal displays according to the second and third aspects of the present invention are now described.

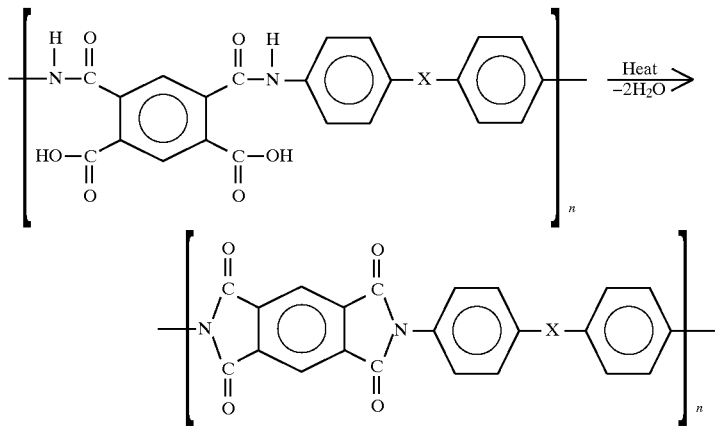

Figure 3:
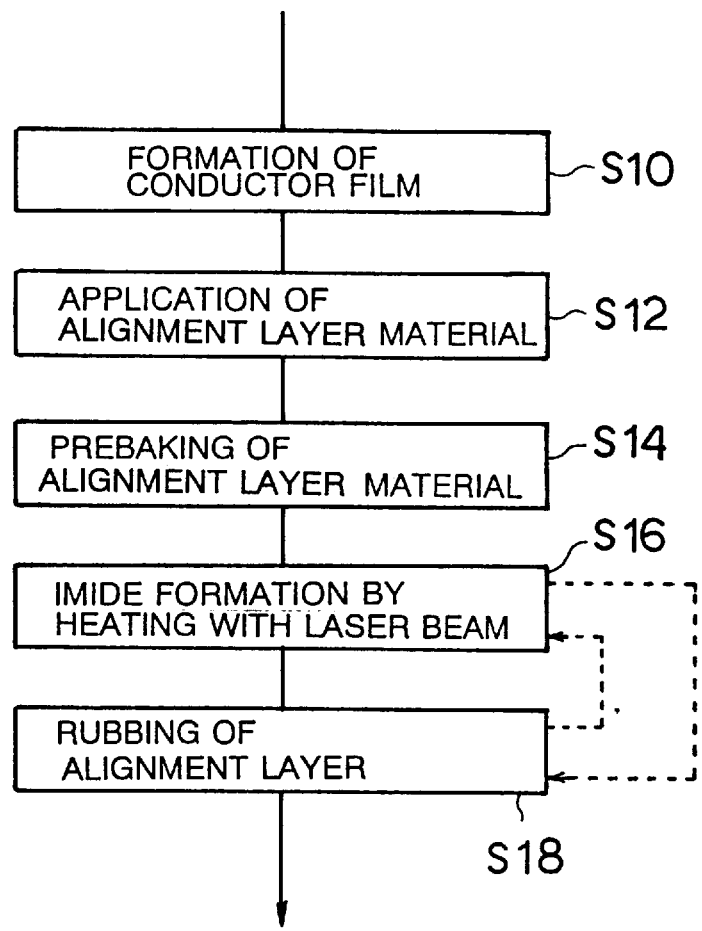
FIG. 3 is a flow chart showing steps of preparing the liquid crystal display shown in FIG. 2.

Referring to FIG. 3, a conductor film such as an ITO film consisting of a transparent conductive material is formed on a surface of a transparent substrate, and patterned (S10).

Then, a material for an alignment layer is applied onto the surface of the conductor film. The alignment layer material is prepared from polyamic acid in accordance with the third aspect, or from soluble polyimide in accordance with the second aspect.

In the case of employing polyamic acid, a polyamic acid film is formed on the surface of the conductor film (S12). Thereafter this film is prebaked at 50° C., for example, and imidized until a prescribed imidiation ratio is attained along the overall surface (S14).

In the case of employing soluble polyimide, on the other hand, the surface of the conductor film is coated with soluble polyimide (S12), and thereafter prebaked at a prescribed temperature of 50° to 70° C., for example (S14).

Then, the alignment layer which is formed on the conductor film 20 is irradiated with a laser beam. In this case, a laser beam which is at an intensity level cutting no polymer bonding of polyimide is selected. In more concrete terms, a laser beam of at least 400 nm in wavelength, such as a $CO_2$ laser beam, for example, is preferably employed. Table 1 shows average bond energy levels between molecules contained in polyimide.

TABLE 1

| Bond | Bond Energy (eV) |
|---|---|
| C=O | 7.63 to 8.32 |
| O—H | 4.81 |
| C—H | 4.29 |
| C—C | 3.72 |
| C—C | 3.60 |
| C—N | 3.16 |

Figure 4A:
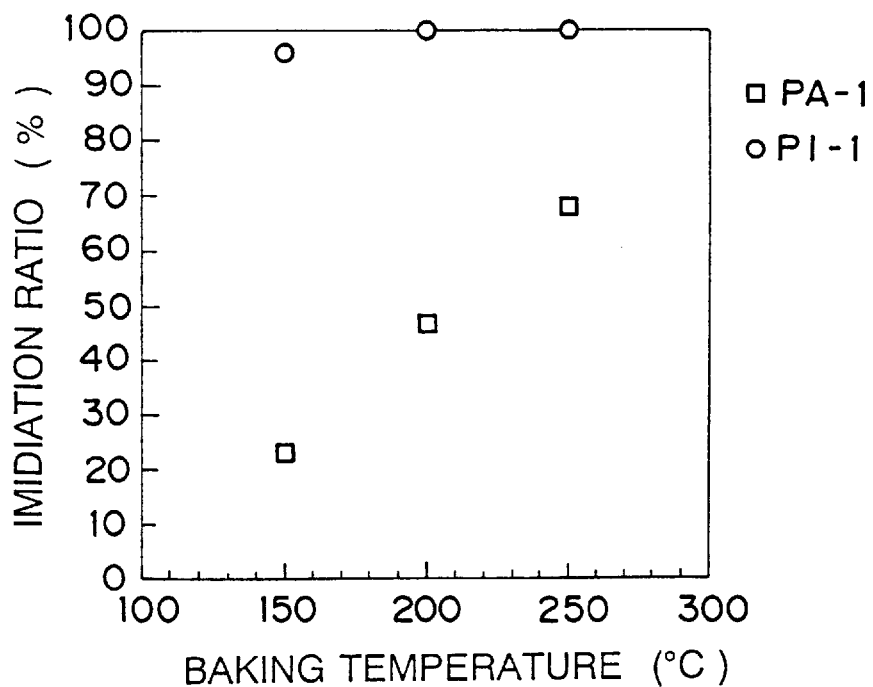
FIGS. 4(a) and 4(b) illustrate relations between baking temperatures for alignment layers, imidiation ratios and pretilt angles respectively.

With respect to the bond energy levels shown in Table 1, the $CO_2$ laser beam is set at a wavelength of 10.6 μm and energy of 0.12 eV, for example. When the surface of the alignment layer is irradiated with the laser beam under such conditions, the region irradiated with the laser beam is heated and its imidiation ratio is changed. Imide formation reaction by such heat treatment is a reaction of converting polyamic acid to polyimide and is generally expressed as follows:

By the above reaction, imide bonding (imide ring) is increased, so that imidiation ratio is increased. For example, FIG. 4(a) shows relations between heating temperatures for polyimide films which are prepared from polyamic acid PA-1 and soluble polyimide PI-1 respectively and imidiation ratios thereof. It is understood that the imidiation ratios are improved as the heating temperatures are increased in both cases. This tendency is particularly remarkable in the case of polyamic acid.

Figure 4B:
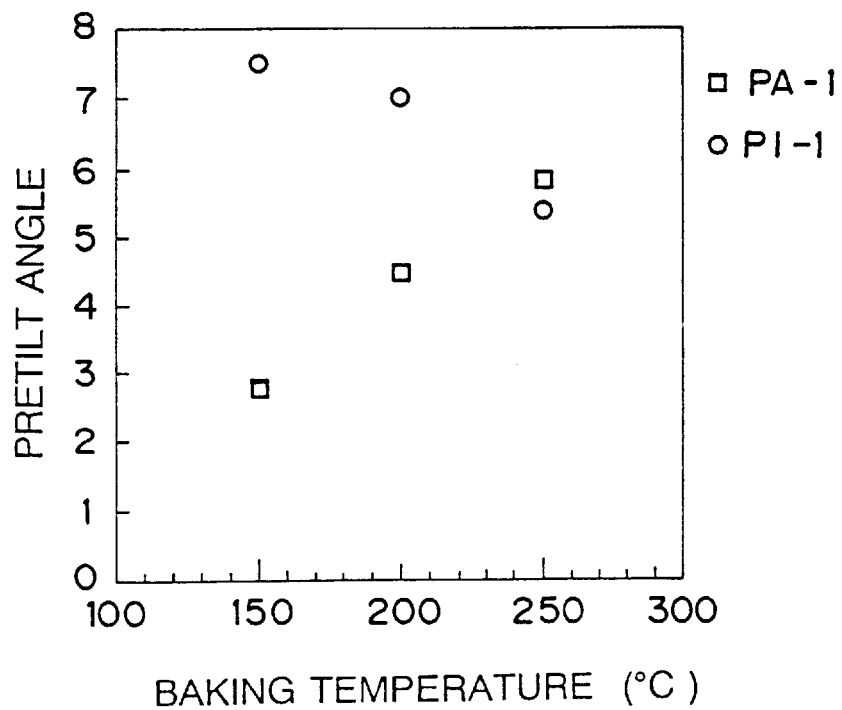

On the other hand, pretilt angles of the liquid crystal which is injected on the alignment layer are varied with the degrees of the imidiation ratios thereof, as understood from FIG. 4(b). In relation to the temperature of 150° C., for example, the pretilt angle is 7.5° with respect to an imidiation ratio of 96% in the film of soluble polyimide, while the pretilt angle is about 2.8° with respect to an imidiation ratio of 20% in the film of polyamic acid. Further, the pretilt angles are varied with baking temperatures (heating temperatures). As clearly understood from FIG. 4(b), the pretilt angle is increased as the baking temperature is raised in relation to the film of polyamic acid, while the former is reduced as the latter is increased in the case of the film of soluble polyimide. Therefore, it is necessary to select the region to be changed in pretilt angle by irradiation with the laser beam, in response to the employed film material (S16).

Figure 5A:
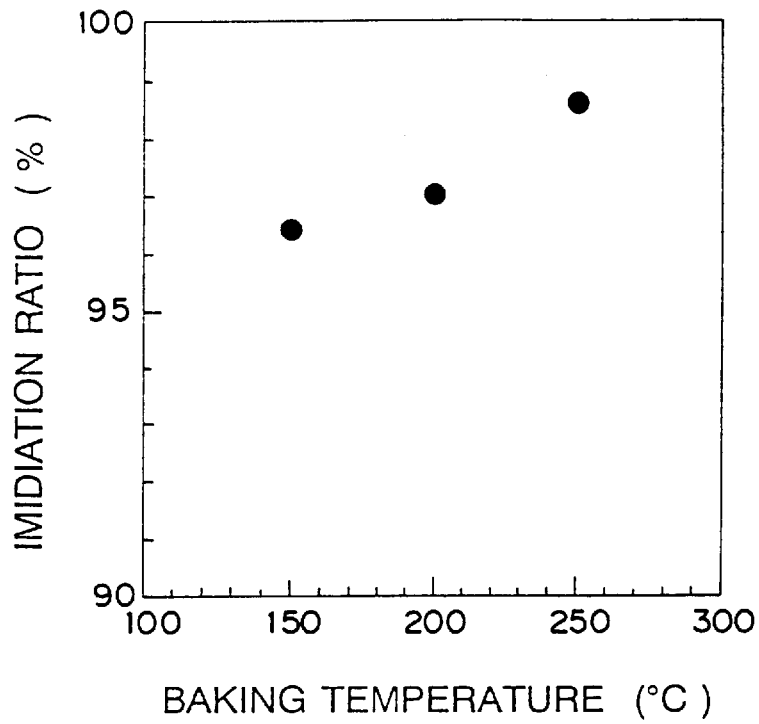
FIGS. 5(a) and 5(b) illustrate relations between baking temperatures for an alignment layer, imidiation ratios and pretilt angles respectively.
Figure 5B:
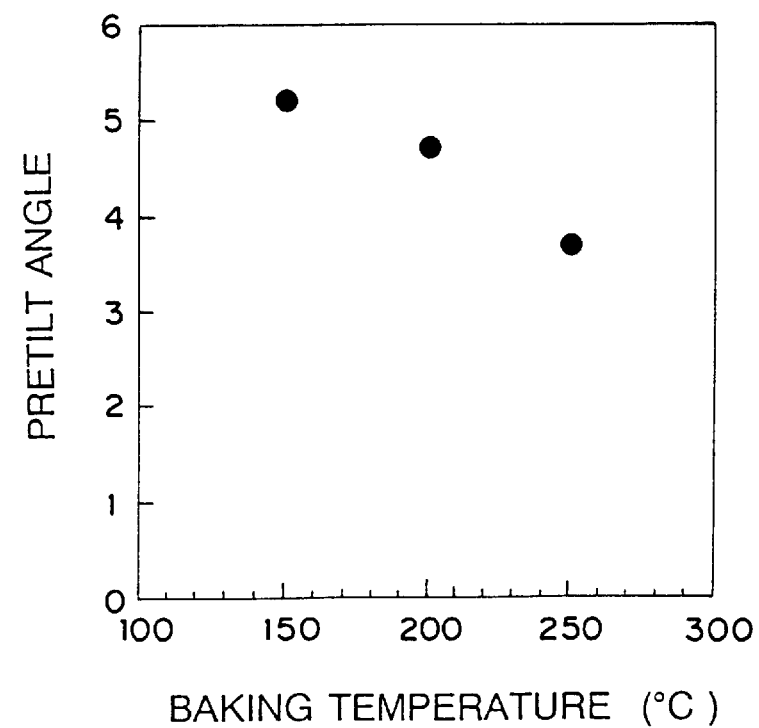

FIGS. 5(a) and 5(b) show relations between baking temperatures, imidiation ratios and pretilt angles in relation to a different type of soluble polyimide (PI-2) film. Referring to FIG. 5(a), the axis of ordinates showing the imidiation ratios is enlarged in scale, so that changes of the imidiation ratios are easy to recognize. It is understood from FIGS. 5(a) and 5(b) that the imidiation ratios are increased and the pretilt angles are reduced as the baking temperatures are increased.

After completion of the imido by irradiation with the laser beam, the surface of the alignment layer is rubbed, and the steps of forming the alignment layer are completed (S18).

The alignment layer may alternatively be rubbed in advance of the imido by irradiation with the laser beam.

Thereafter steps of assembling a liquid crystal panel and injecting a liquid crystal are carried out, while detailed description thereof is omitted.

Figure 6A:
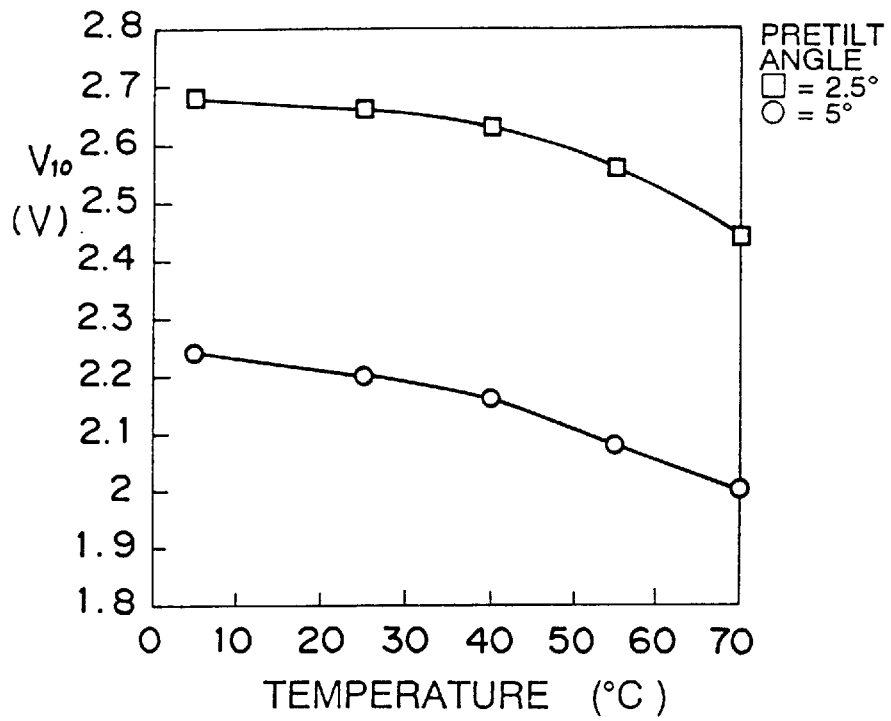
FIGS. 6(a) and 6(b) illustrate relations between used temperatures, threshold values $V_{10}$ and threshold values $V_{90}$ respectively.
Figure 6B:
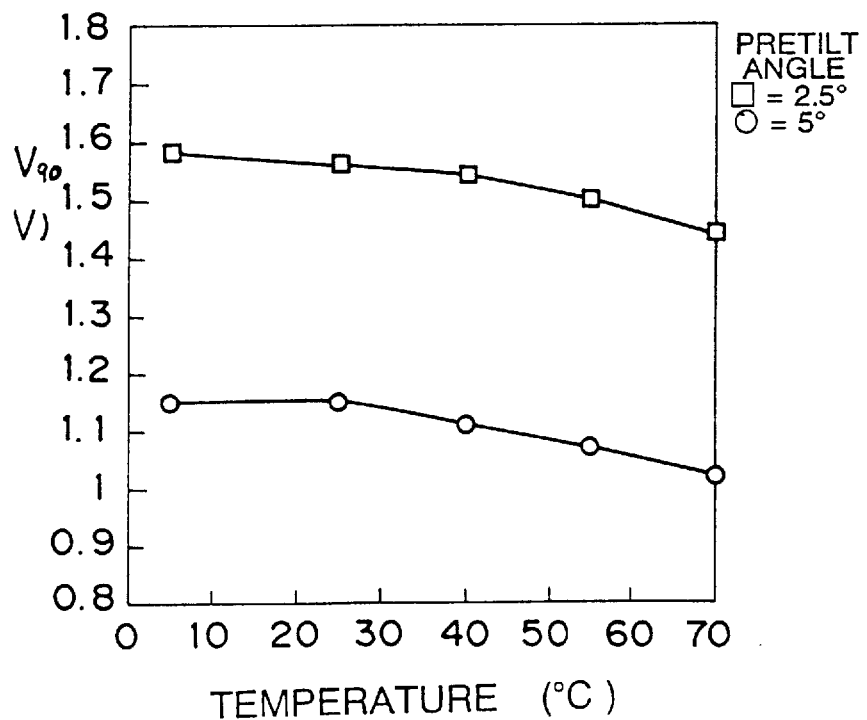

In the liquid crystal display which is prepared in the aforementioned manner, the region imidized by irradiation with the laser beam has an imidiation ratio which is different from that of the remaining region. Thus, the liquid crystal which is injected on this surface has different pretilt angles in an initial orientation state, as described above. Due to the different pretilt angles, threshold voltages in the respective regions are changed when a prescribed voltage is applied to the conductor film, as shown in FIGS. 6(a) and 6(b). The axis of ordinates in FIG. 6(a) shows threshold voltage values $V_{10}$ in the case of changing brightness from 100% to 10%, while that in FIG. 6(b) shows threshold voltages $V_{90}$ in the case of changing brightness to 90%. Assuming that the temperatures are constant in these figures, the values of the threshold voltages $V_{10}$ and $V_{90}$ are reduced as the pretilt angles are increased. Thus, it is understood that actual drive of liquid crystal is varied in a plurality of regions having different threshold voltages caused by different pretilt angles, even if a uniform voltage is applied from the conductor film. Therefore, viewing angles, particularly preferential viewing angles, are varied with the regions. Therefore, the viewing angles are enlarged over the entire liquid crystal display, and a visible range of the display screen is enlarged.

While the imidiation ratios of the respective regions of the alignment layer are varied by increasing the imidiation ratio of the irradiated region by irradiation with the laser beam in the aforementioned embodiment, the intensity of the laser beam may be increased to cut bonding between imidized polymers thereby reducing the imidiation ratio, for varying the imidiation ratios of the respective regions of the alignment layer according to the fourth aspect of the present invention. In this case, the laser intensity is selected at an energy value which is higher than bond energy of polymer bonding of polyimide. An embodiment according to the fourth aspect is described later.

Exemplary arrangements of regions having different pretilt angles in plane display regions of liquid crystal displays, i.e., those having different imidiation ratios of alignment layers, are now described.

Figure 7A:
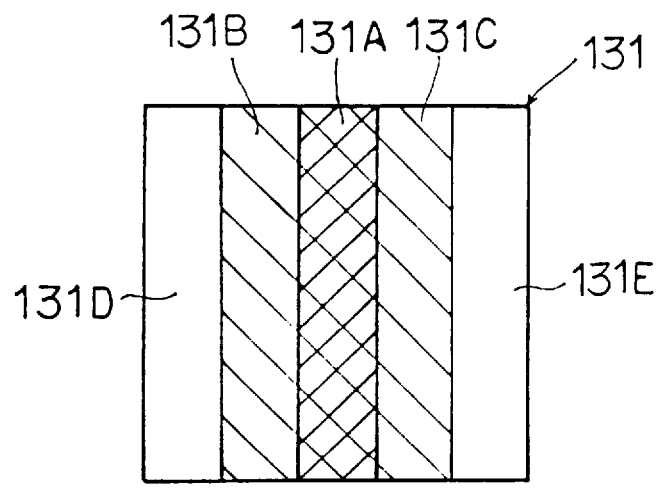
FIGS. 7(a) and 7(b) illustrate exemplary arrangements of regions having different imidiation ratios.

For example, FIG. 7(a) is a plan view showing regions having different imidiation ratios which are formed in a pixel 131. In this example, a region 131A having the highest imidiation ratio is provided in the form of a stripe at the central portion of the pixel 131, while regions 131B and 131C having lower imidiation ratios lower than the region 131A are provided on both sides thereof in the form of stripes. Further, regions 131D and 131E having still lower imidiation ratios are further formed on both sides thereof.

Figure 7B:
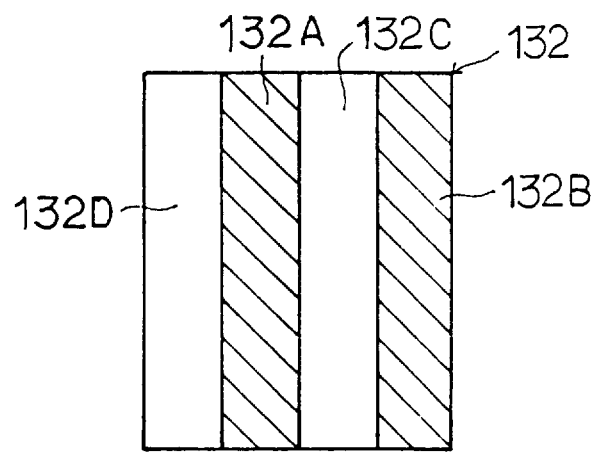

In an example shown in FIG. 7(b), on the other hand, regions 132A and 132B having relatively high imidiation ratios and regions 132D and 132C having relatively low imidiation ratios are alternately formed in a pixel 132, in the form of stripes. Such a structure contributes to increase of viewing angles, while the same is also applicable to gradation display. Namely, difference in pretilt angle appears as difference in contrast between the respective regions. Thus, it is possible to perform gradation display by properly stepwisely setting pretilt angles of respective strip regions which are set in a pixel region.

Figure 8A:
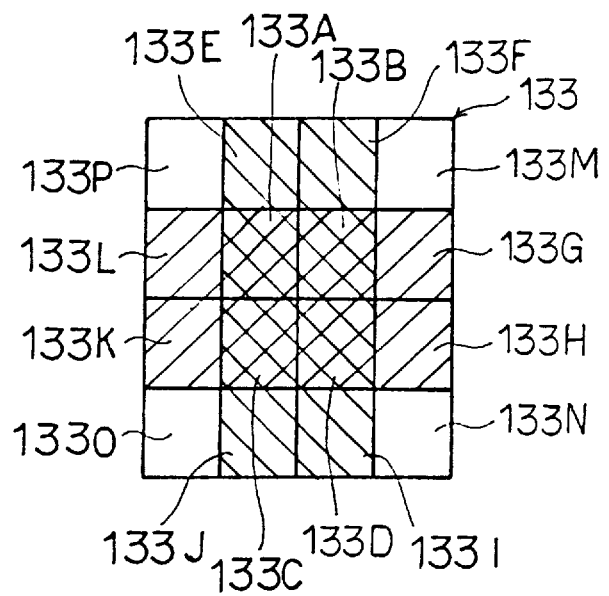
FIGS. 8(a) and 8(b) illustrate other exemplary arrangements of regions having different imidiation ratios.
Figure 8B:
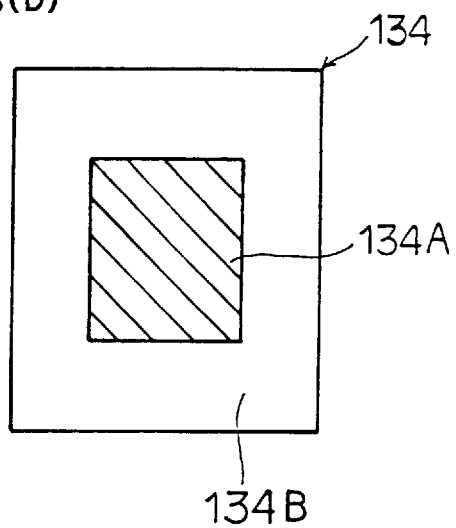

FIGS. 8(a) and 8(b) show other examples of divided regions in pixels, similarly to FIGS. 7(a) and 7(b). Referring to FIG. 8(a), regions 133A to 133D having the highest imidiation ratios are formed in a central portion of a pixel 133, while regions 133E to 133L having high imidiation ratios are successively formed on outer sides thereof, and regions 133M to 133P having the lowest imidiation ratios are formed on corder portions of the pixel 133. In this structure, the imidiation ratios are set in three stages.

Referring to FIG. 8(b), on the other hand, a region 134A having a high imidiation ratio is formed in the central portion of one pixel 134, and a region 134B having a low imidiation ratio is formed around the same.

Figure 9:
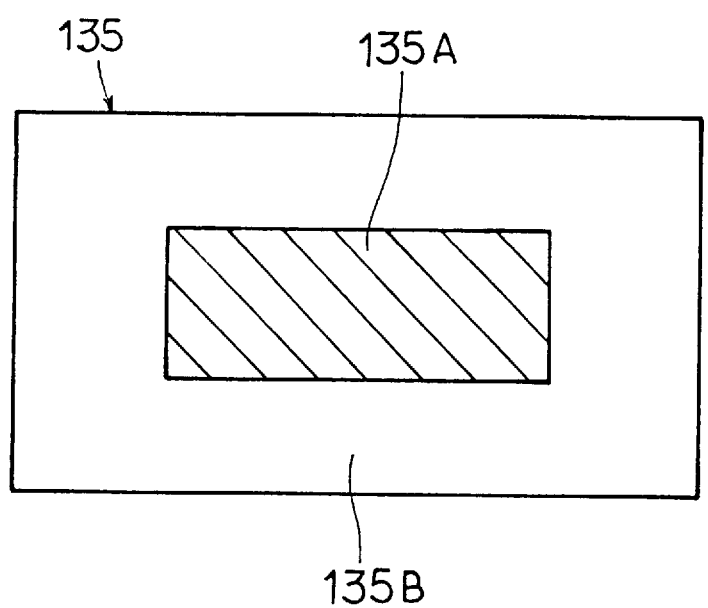
FIG. 9 illustrates a further exemplary arrangement of regions having different imidiation ratios.

According to the present invention, the regions having different imidiation ratios are not restricted to those set in a pixel region, but may alternatively be set along the overall display panel region of the liquid crystal display. Referring to FIG. 9, a region 135A having a relatively high imidiation ratio with respect to a peripheral region 135B is provided in the central portion of a panel 135.

Figure 10:
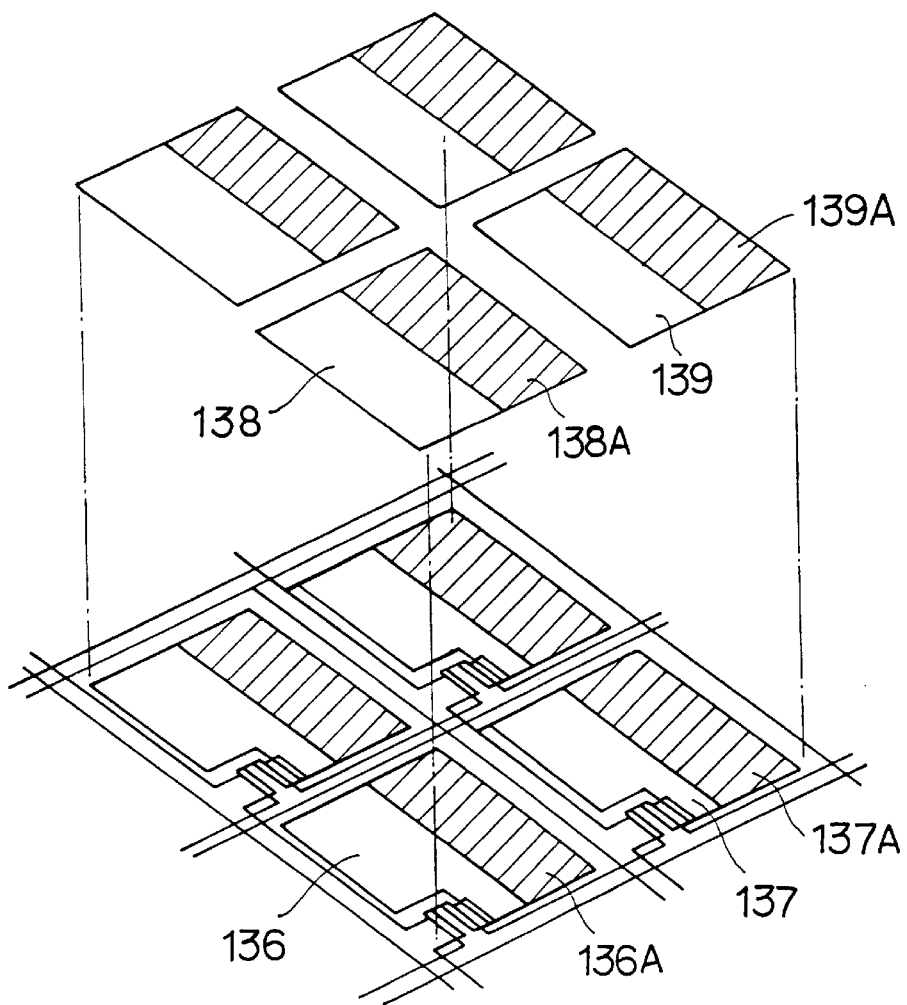
FIG. 10 illustrates a further exemplary arrangement of regions having different imidiation ratios.

FIG. 10 is a perspective view for illustrating an exemplary arrangement of irradiated regions, i.e., regions having different imidiation ratios, in pixels. Referring to FIG. 10, alignment layers 136 and 137 are formed on a substrate which is provided with a driving part such as a TFT. On the other hand, alignment layers 138 and 139 are formed on an opposite substrate. The alignment layer 138 is positioned in a pixel region which is opposite to the alignment layer 136, while the alignment layer 139 is positioned in a pixel region which is opposite to the alignment layer 137. The alignment layers 138 and 139, which are formed on a common electrode, are continuously formed on the overall surface in practice. FIG. 10 shows these alignment layers 138 and 139 in a divided state, in order to facilitate easy understanding of correspondence in the pixels.

Referring to FIG. 10, regions which are irradiated with a laser beam to be varied in imidiation ratio are shown in a hatched manner. The alignment layers 136 and 137 are provided with irradiated regions 136A and 137A in divided regions which are separated from the TFT respectively. The opposite alignment layers 138 and 139 are also provided with irradiated regions 138A and 139A in regions opposite to the irradiated regions 136A and 137A respectively.

The laser beam may be continuously applied from first ends to second ends of the alignment layers 136 to 139, or application and no application may be repeated so that only necessary portions are irradiated with the laser beam. For example, only the portions of the alignment layers 136 to 139 provided in the pixel regions may be irradiated with the laser beam, so that black matrix portions between the pixels are not irradiated. The diameter and the shape of the laser beam spot are not particularly restricted, but can be properly selected in response to the sizes and the shapes of the pixels. For example, the laser spot diameter can be varied in the range of several $\mu$m square to 5 cm square. When a laser beam of 30 $\mu$m in spot diameter is applied at a frequency of 50 Hz, for example, it is possible to scan the alignment layers 136 to 139 at a speed of 1.5 mm/sec.

Figure 11:
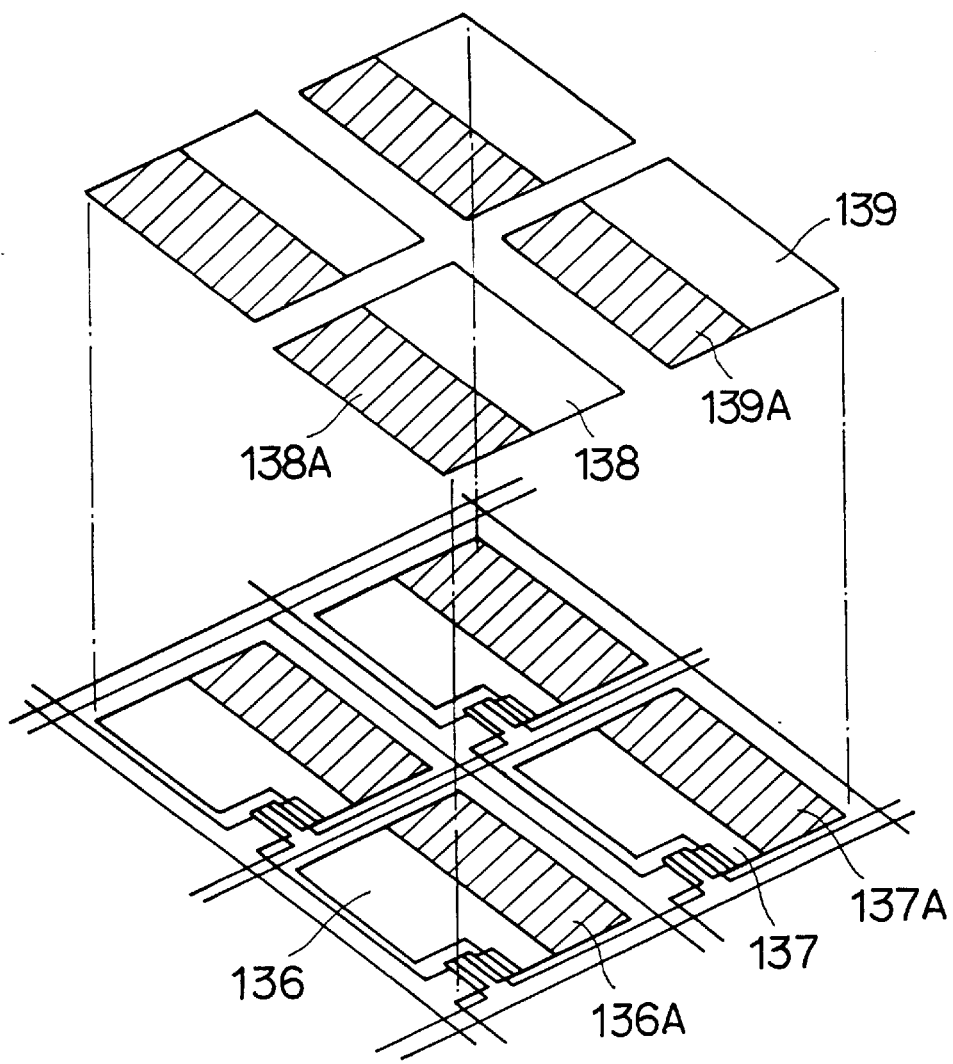
FIG. 11 illustrates a further exemplary arrangement of regions having different imidiation ratios.

FIG. 11 is a perspective view showing another exemplary arrangement of irradiated regions in pixels. Referring to FIG. 11, irradiated regions 136A and 137A of alignment layers 136 and 137 are arranged not to be opposed to irradiated regions 138A and 139A of opposite alignment layers 138 and 139. Therefore, the irradiated regions 136A and 137A are opposed to unirradiated regions of the alignment layers 138 and 139. Further, the irradiated regions 138A and 139A are opposed to unirradiated regions of the opposite alignment layers 136 and 137.

Figure 12:
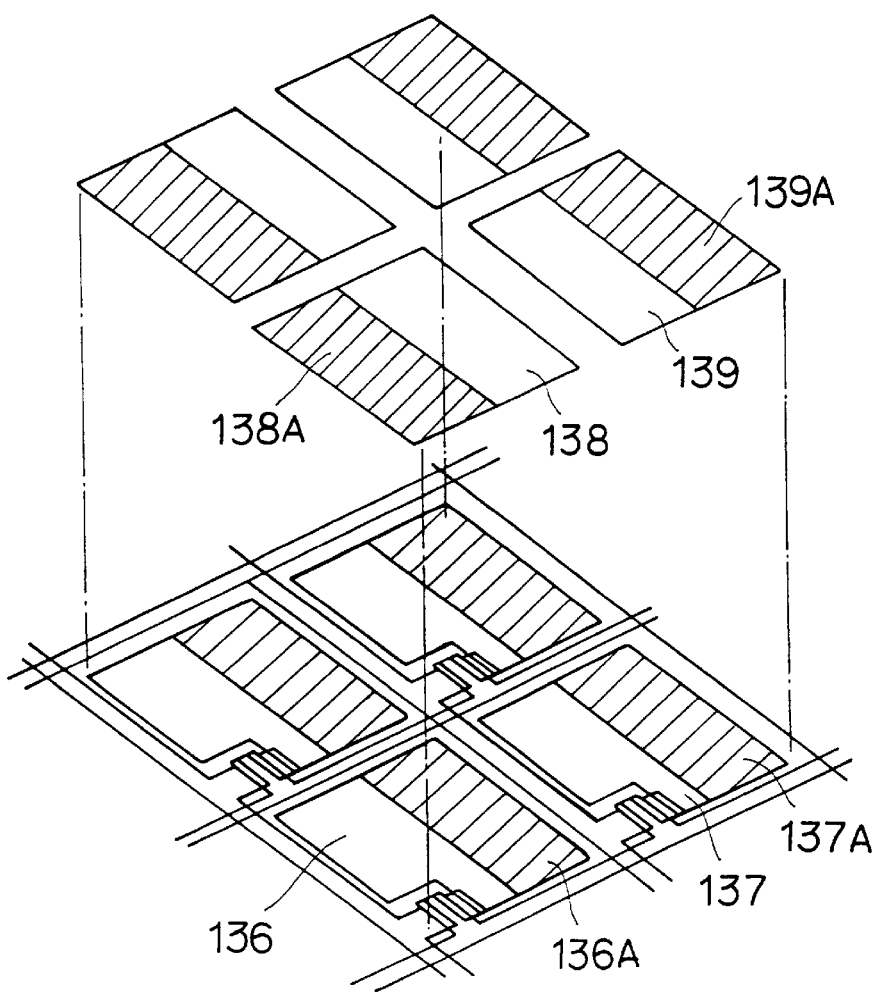
FIG. 12 illustrates a further exemplary arrangement of regions having different imidiation ratios.

FIG. 12 is a perspective view showing still another exemplary arrangement of irradiated regions in pixels. Referring to FIG. 12, alignment layers 136 and 138 which are opposite to each other are provided with irradiated regions 136A and 138A, not to be opposed to each other. On the other hand, other alignment layers 137 and 139 which are opposite to each other are provided with irradiated regions 137A and 139A, to be opposed to each other. In this arrangement, such positional relations between irradiated regions are attained every other pixel.

Figure 13:
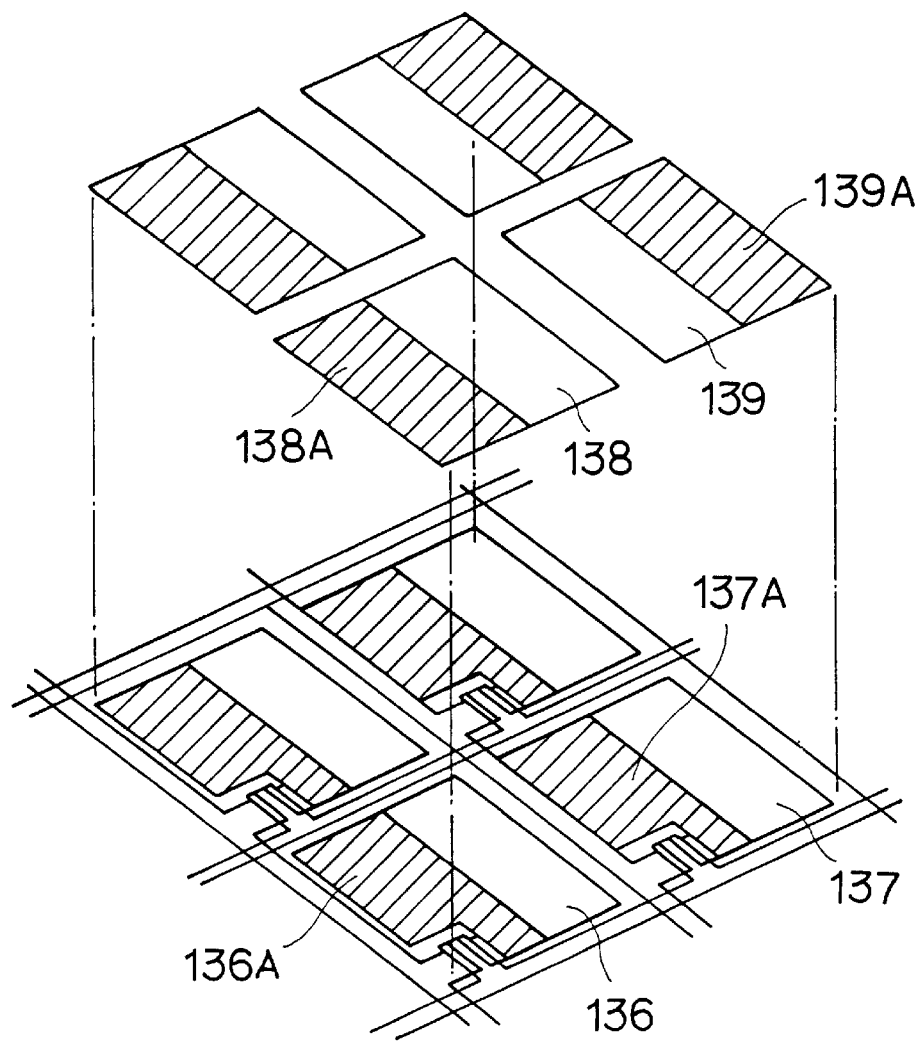
FIG. 13 illustrates a further exemplary arrangement of regions having different imidiation ratios.

FIG. 13 is a perspective view showing a further exemplary arrangement of irradiated regions in pixels. Referring to FIG. 13, irradiated regions 136A and 138A of alignment layers 136 and 138 which are opposite to each other are opposed to each other, while irradiated regions 137A and 139A of other opposite alignment layers 137 and 139 are formed not to be opposed to each other.

Figure 14:
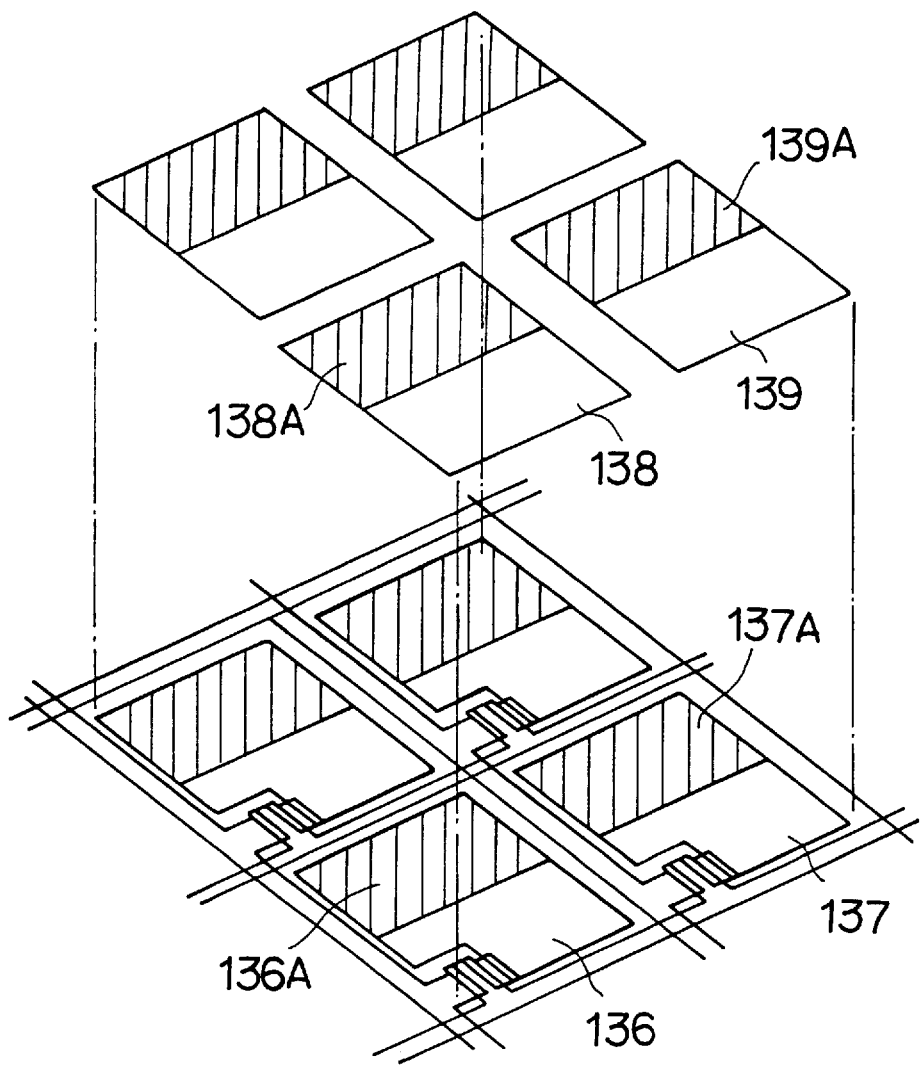
FIG. 14 illustrates a further exemplary arrangement of regions having different imidiation ratios.

FIG. 14 is a perspective view showing a further exemplary arrangement of irradiated regions in pixels. Referring to FIG. 14, irradiated regions are formed in a direction perpendicular to those of the aforementioned arrangements. Irradiated regions 136A and 138A of opposite alignment layers 136 and 138 are formed to be opposed to each other. Also in other opposite alignment layers 137 and 139, irradiated regions 137A and 139A are formed to be opposed to each other.

Figure 15:
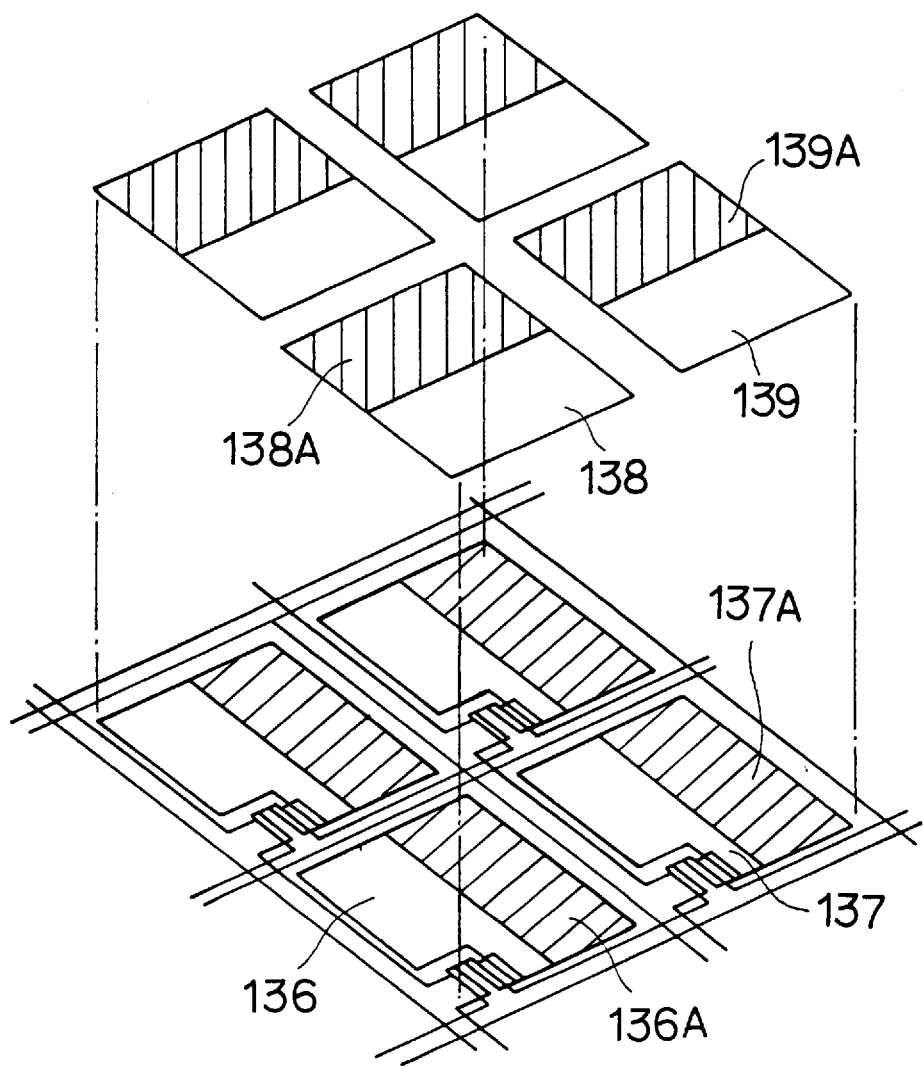
FIG. 15 illustrates a further exemplary arrangement of regions having different imidiation ratios.

FIG. 15 is a perspective view showing a further exemplary arrangement of irradiated regions in pixels. Referring to FIG. 15, irradiated regions 136A and 137A of alignment layers 136 and 137 are formed to be perpendicular to irradiated regions 138A and 139A of alignment layers 138 and 139 which are opposed to the alignment layers 136 and 137 respectively. Therefore, the irradiated regions 136A and 138A are opposed to each other in a partially overlapping manner. Thus, this arrangement defines three types of regions in which both of opposite alignment layers are irradiated with the laser beam, only one of the opposite alignment layers is irradiated with the laser beam, and both of the alignment layers are unirradiated. Therefore, it is possible to form three types of regions having different pretilt angles, thereby further improving the viewing angle property.

A sample of the inventive liquid crystal display was prepared by dividing each alignment layer of each pixel into two regions to be in the state of arrangement of the irradiated regions shown in FIG. 11, and irradiating only one of the regions with a laser beam for increasing the imidiation ratio of the irradiated region as compared with the unirradiated region. In more concrete terms, polyimide alignment layers were formed by applying soluble polyimide, prebaked at 50° C. and thereafter heat treated at 150° C., to attain imidiation ratios of 96.2%. Then, a half region of the pixel of 60 μm by 60 μm was irradiated with an He-Ne laser beam of 632.8 nm in wavelength in a spot diameter of 30 μm by oscillation twice. The laser beam was at a frequency of 50 Hz and a scanning rate of 0.75 mm/sec. Thus, the imidiation ratios of the irradiated regions were increased to 98.6%. If such a laser beam has a rectangular spot shape of 30 μm by 60 μm, it is possible to irradiate the half region of the pixel with the laser beam by single oscillation.

A TN liquid crystal display comprising alignment layers provided with regions having high imidiation ratios in parts of pixel regions was prepared in the aforementioned manner, and subjected to measurement of the viewing angle property.

For the purpose of comparison, polyimide alignment layers were prepared from the same soluble polyimide as the above, then prebaked at 50° C., and thereafter heat treated at 150° C. thereby preparing a TN liquid crystal display comprising alignment layers (imidiation ratio: 96%) having a homogeneous imidiation ratio as a whole, which was subjected to evaluation of the viewing angle property.

Figure 16:
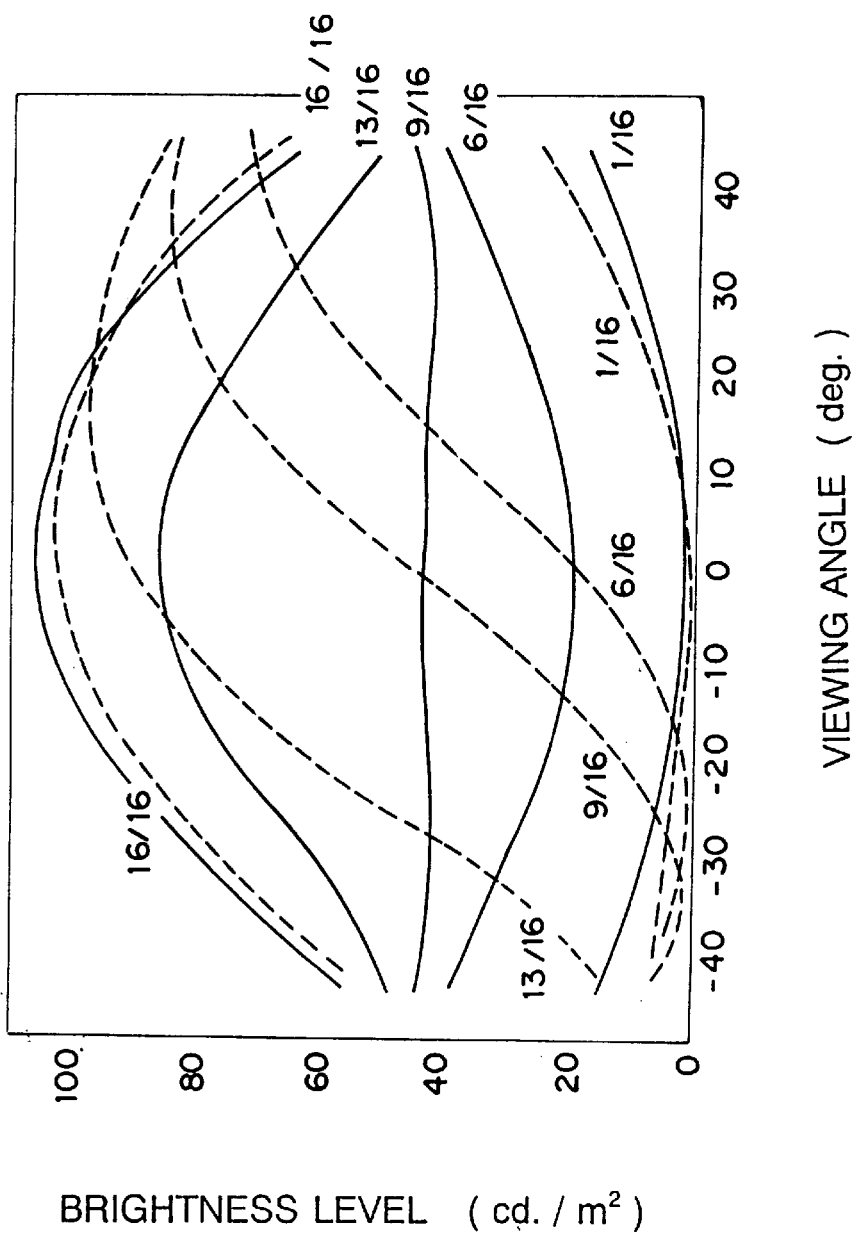
FIG. 16 illustrates relations between viewing angles and brightness levels in the embodiment of the present invention.

FIG. 16 illustrates the viewing angle properties of the liquid crystal displays obtained in the aforementioned manner. The axis of abscissas shows the viewing angles, and the axis of ordinates shows gradient brightness levels. Solid and dotted lines show values of the sample according to the present invention and the comparative sample respectively.

It is clearly understood from FIG. 16 that the viewing angle property was improved and reduction of brightness and the contrast ratio caused by deviation of the viewing angle direction was reduced upon observation in a state facing the display in the inventive liquid crystal display which was provided with regions having different pretilt angles in each pixel by varying imidiation ratios of parts of the alignment layers in the pixel as compared with the comparative liquid crystal display.

Also when polyimide alignment layers were prepared from polyamic acid in place of soluble polyimide and partially irradiated with a laser beam, similar improvement of the viewing angle property was observed.

While the prebaking heat treatment is carried out in a furnace such as a heating furnace in the aforementioned embodiment, the prebaking may alternatively performed by irradiation with a laser beam. In this case, it is possible to continuously carry out the laser application for prebaking and that for changing the imidiation ratios as a series of steps. Due to employment of laser application, further, it is possible to heat only the alignment layers without heating a part such as a transistor part, which is not desirably heated.

An embodiment according to the fourth aspect of the present invention is now described.

According to the fourth aspect, a polyimide alignment layer is partially irradiated with a laser beam, so that the imidiation ratio of the irradiated region is reduced. In this case, the laser beam is preferably prepared from that of 300 to 400 nm in wavelength, as described above, such as an XeF laser beam of 353 nm in wavelength or an XeCl laser beam of 308 nm in wavelength, for example.

Concrete Experimental Example is now described.

A polyimide alignment layer which was prepared from soluble polyimide was prebaked at 50° C. and thereafter heat treated at 180° C., to have an imidiation ratio of 95%. This polyimide alignment layer was irradiated with an XeF laser beam at energy density of 50 mJ/cm$^2$, whereby the imidiation ratio was reduced to 85%. Thus, it was possible to reduce the imidiation ratio by irradiating the film with the XeF laser beam.

Figure 17:
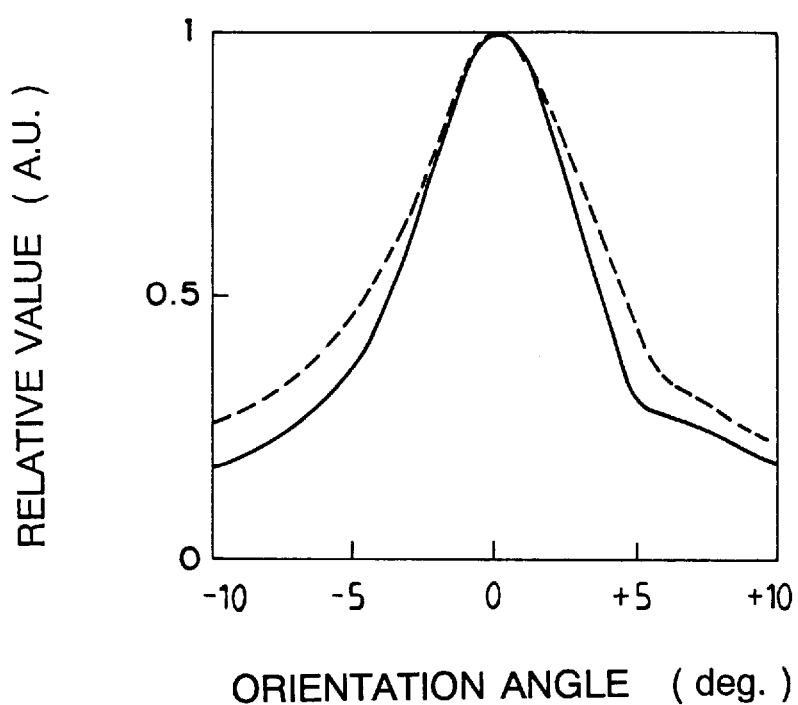
FIG. 17 illustrates relations between orientation angles of a liquid crystal and relative values of reflection brightness peak strength of a liquid crystal measured by polarized laser beam in the embodiment of the present invention.

FIG. 17 illustrates the result of measurement of reflection brightness peak strength of liquid crystal in the interface between a liquid crystal and an alignment layer on a substrate, which was measured by polarized laser beam after liquid crystal was introduced onto the polyimide alignment layer irradiated in the aforementioned manner. The axis of abscissas shows orientation angles of liquid crystal, and the axis of ordinates shows relative values of the reflection brightness peak strength. Solid and dotted lines show the alignment layer before and after irradiation with the laser beam respectively. It is clearly understood from FIG. 17 that the orientation remained substantially unchanged and no function of the alignment layer was lost through irradiation with the laser beam.

The pretilt angle was at 4.9° and 5.6° before and after irradiation with the laser beam respectively. Thus, it is understood that the pretilt angle was increased due to reduction of the imidiation ratio.

For the purpose of comparison, a polyimide alignment layer was irradiated with a KrF laser beam of 248 nm in wavelength, which is a laser beam of not more than 300 nm in wavelength, with energy density of 70 mJ/cm² similarly to the above. In this case, the film itself was collapsed and scattered. Thus, it is understood that a laser beam of 300 to 400 nm in wavelength is preferable.

Embodiments according to the fifth and sixth aspects of the present invention are now described.

Figure 18:
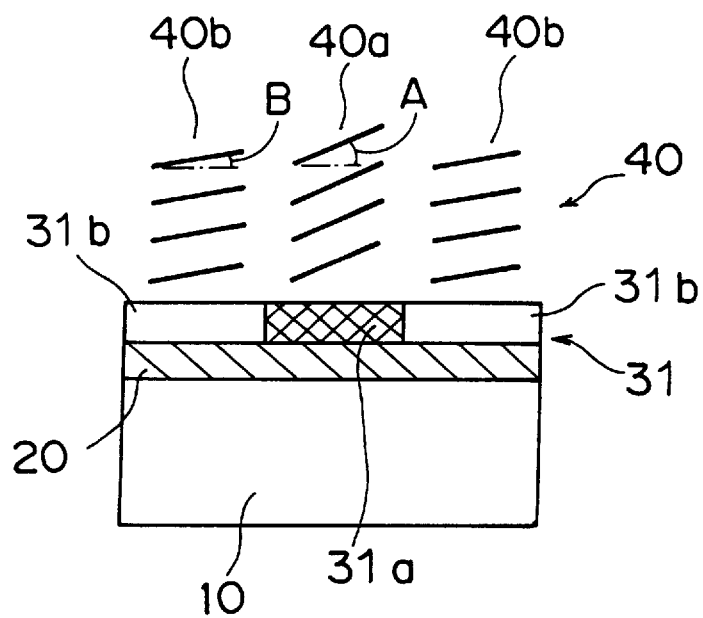
FIG. 18 is a sectional view showing a principal part of a liquid display of an embodiment according to a fifth aspect of the present invention.

FIG. 18 is a sectional view showing a liquid crystal display of an embodiment according to the fifth aspect of the present invention. The liquid crystal display comprises a light-transmittable substrate 10 which is made of glass or light-transmittable synthetic resin, a conductor film 20 which is formed on the surface of the light-transmittable substrate 10, and an alignment layer 31 which is further formed on its surface. A liquid crystal 40 is injected on the alignment layer 31. A structure (not shown) which is identical to that formed by the alignment layer 30, the conductor film 20 and the light-transmittable substrate 10 is symmetrically provided on the upper surface of the liquid crystal 40.

The surface of the alignment layer 31, which is made of a photosensitive polymer alignment layer material such as a photosensitive material of acrylic resin, for example, is rubbed. The alignment layer 31 of the photosensitive polymer material has regions 31a and 31b having different degrees of polymerization, which are formed by a method described later. The different degrees of polymerization of the alignment layer 31 result in different pretilt angles of the liquid crystal 40, which is injected thereon, in an initial orientation state. Referring to FIG. 18, a pretilt angle A of a liquid crystal portion 40a which is positioned on the region 31a having a higher degree of polymerization is set to be larger than a pretilt angle B of a liquid crystal portion 40b which is positioned on the region 31b having a lower degree of polymerization, for example.

Figure 19:
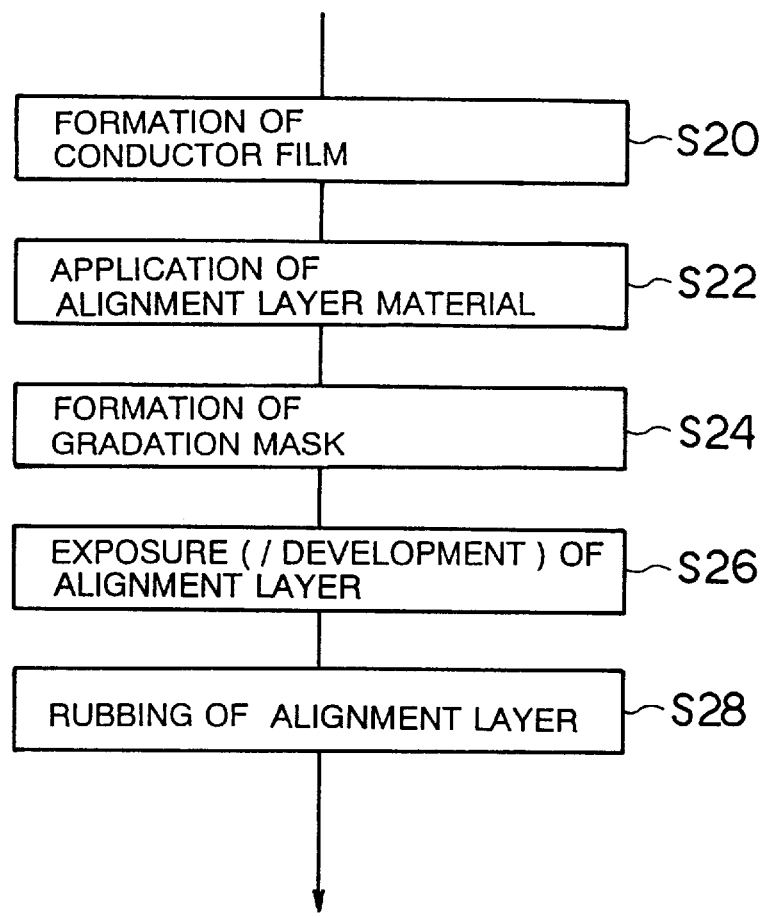
FIG. 19 is a flow chart showing preparation steps in an embodiment according to a sixth aspect of the present invention.

A method of preparing the liquid crystal display shown in FIG. 18 is now described with reference to FIGS. 19 and 20.

First, a film 20 of a transparent conductive material such as an ITO film is formed on a surface of a light-transmittable substrate 10, and patterned (S20).

Then, an alignment layer material is applied onto the surface of the conductor film 20. The alignment layer material is prepared from a negative or positive photosensitive polymer material. The degree of polymerization of a region which is photosensitized by irradiation with light such as ultraviolet light is improved in the negative photosensitive polymer material, while that of a region which is photosensitized by irradiation with light is reduced in the positive photosensitive polymer material. Such a photosensitive polymer material is applied onto the surface of the light-transmittant substrate 10 which is provided with the conductor film 20 by spin coating or roll coating (S22).

The photosensitive polymer alignment layer 31 is prebaked, and thereafter a gradation mask 210 having different transmittance values is formed on its surface. As shown in FIG. 20, the gradation mask 210 is provided with regions having different transmittance values with respect to applied light through regions 210a and 210b having different thicknesses or combination of partially different materials (S24).

Thereafter the surface of the photosensitive polymer alignment layer 31 is irradiated with light 220 such as ultraviolet light through the gradation mask 210, so that the photosensitive polymer film 31 is exposed. Referring to FIG. 20, an alignment layer region 31a which is positioned under the region 210a of the gradation mask 210 having a smaller thickness is increased in exposure as compared with an alignment layer region 31b which is positioned under the region 210b of the gradation mask 210 having a larger thickness, for example. Regions having high and low degrees of polymerization are formed in the alignment layer 31 in response to the exposures. Namely, the region 31a having a larger exposure is at a higher degree of polymerization than the region 31b having a smaller exposure when the negative alignment layer material is employed. When the positive alignment layer material is employed, on the other hand, the degree of polymerization of the region 31a having a larger exposure is reduced as compared with the region 31b having a smaller exposure.

After the aforementioned exposure, the alignment layer 31 is post-baked (S26).

Further, the surface of the alignment layer 31 is rubbed (S28), and the steps of forming the alignment layer 31 are completed.

Through the aforementioned steps, a plurality of regions having different degrees of polymerization are formed in the photosensitive polymer alignment layer 31.

In this embodiment, the exposed photosensitive polymer alignment layer 31 may be further developed, to be thereafter post-baked. When such development is carried out, regions having different surface shapes and surface states are formed in the photosensitive polymer alignment layer 31 due to remaining film ratios which are varied with the exposures etc.

A concrete embodiment of preparation of an alignment layer from negative acrylic resin serving as a photosensitive polymer alignment layer material is now described.

A solution of a photosensitive polymer material ("JNPC-101" (trade name) by Japan Synthetic Rubber Co., Ltd.) is dropped on a surface of a conductor film 20, to form a thin film of an, alignment layer material having a prescribed thickness by spin coating. Then, this film is prebaked at a temperature of 80° C. for 3 minutes. Then, a gradation mask 210 having a plurality of regions which are at different transmittance values is arranged on the surface of the alignment layer material thin film. The respective regions of the gradation mask 210 are previously adjusted so that exposures to the alignment layer material are 50 to 1000 J/cm².

After the gradation mask 210 is arranged, the alignment layer material thin film is irradiated with ultraviolet light 220 of 450 nm in wavelength for 10 seconds by a mercury short arc lamp or the like, so that the alignment layer material is photosensitized. Due to this exposure, regions having different exposures are formed in the alignment layer material thin film in correspondence to the film thicknesses of the gradation mask 210.

Then, the gradation mask 210 is removed, and thereafter post baking treatment is performed at a temperature of 180° C. for 30 minutes, and the steps of preparing the alignment layer 31 are completed.

In another embodiment, the alignment layer material thin film which is exposed through the gradation mask 210 can be developed. Thus, difference is caused in the surface state such as surface roughness of the alignment layer, which in turn is post-baked at a temperature of 180° C. for 30 minutes, and the steps of preparing the alignment layer 31 are thus completed.

When negative acrylic resin is employed as the photosensitive polymer material, a portion having a larger exposure is at a higher degree of polymerization than that having a smaller exposure. Consequently, a pretilt angle of a portion of the liquid crystal which is positioned on the region having a higher degree of polymerization is set to be larger than that of a portion which is positioned on the region having a lower degree of polymerization, in an initial orientation state of the liquid crystal after preparation of a liquid crystal panel.

Figure 20:
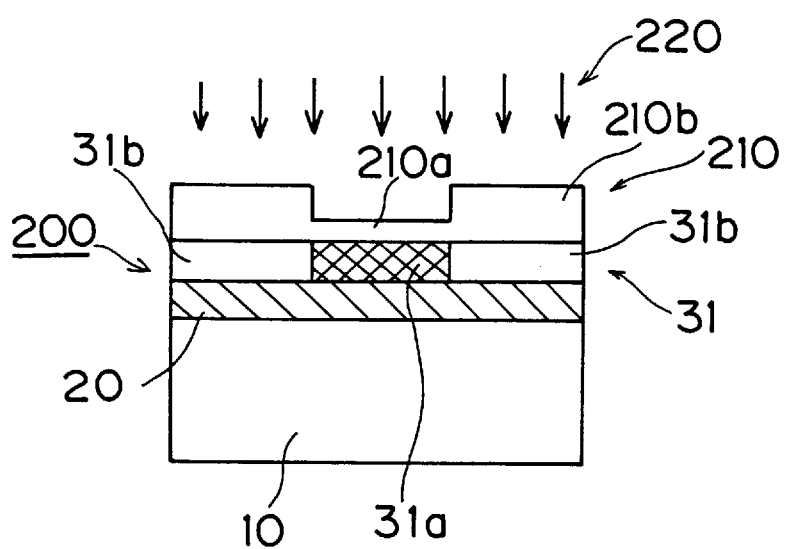
FIG. 20 is a sectional view showing a step of preparing the embodiment shown in FIG. 18.

The sectional structure of the liquid crystal display shown in FIGS. 18 and 20 is illustrated in relation to a single pixel region, and regions having different degrees of polymerization are set in various manners in the illustrated single pixel region. As to the arrangement of the regions having different degrees of polymerization, the arrangement shown in any one of FIGS. 7(*a*), 7(*b*), 8(*a*), 8(*b*) and 10 to 15 in relation to the embodiments according to the first to fourth aspects of the present invention is applicable. Further, the present invention is not restricted to one pixel region, but region setting shown in FIG. 9, for example, is also possible. In the liquid crystal display according to the fifth aspect, pretilt angles of the liquid crystal in the initial orientation state can be set at various values by properly changing the degrees of polymerization of the alignment layer in prescribed regions, similarly to the first to fourth aspects. Thus, preferential viewing angles can be varied, thereby attaining an effect of improving the viewing angle property as the result.

The structure according to the fifth aspect can be applied to only one or both of two alignment layers which are opposed to each other through a liquid crystal layer.

An embodiment according to the seventh aspect of the present invention is now described.

Figure 21:
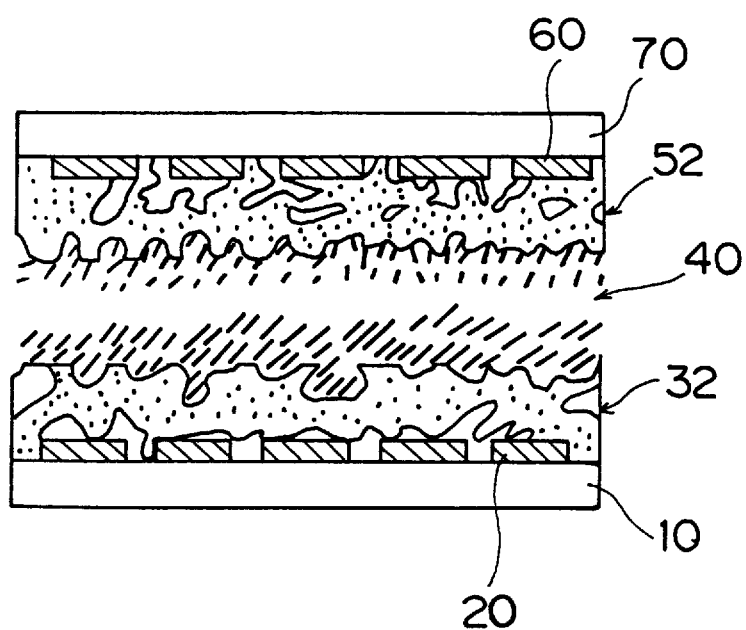
FIG. 21 is a sectional view showing a principal part of a liquid crystal display of an embodiment according to a seventh aspect of the present invention.

FIG. 21 is a sectional view showing a principal part of a liquid crystal display of the embodiment according to the seventh aspect of the present invention. The liquid crystal display comprises light-transmittable substrates 10 and 70 which are made of glass or light-transmittable synthetic resin, conductor films 20 and 60 which are formed on the light-transmittable substrates 10 and 70 respectively, and alignment layers 32 and 52 which are further formed thereon. A liquid crystal 40 is injected between the pair of alignment layers 32 and 52. The pair of conductor films 20 and 60 serve as a pair of counter electrodes for applying a voltage to the liquid crystal 40.

The alignment layers 32 and 52 are formed by thin films having pores at least in surfaces thereof. The pores provided in the surfaces of the alignment layers 32 and 52 define textures on these surfaces, thereby defining an initial orientation state of the liquid crystal 40 along the texture shapes. Namely, the liquid crystal molecules are oriented along the texture shapes of the surfaces of the alignment layers 32 and 52 in the initial orientation state of the liquid crystal 40, thereby defining domains having various pretilt angles in fine regions corresponding to the texture shapes. Preferential viewing angles are varied with the domains, which in turn are recognized as being averaged in one pixel, whereby wide viewing angles can be attained.

The alignment layers 32 and 52 having texture shapes on surfaces thereof can be prepared from and formed by various materials and methods. For example, the same are formed by polymer alignment layers which are prepared from a mixed material of a liquid crystal and a polymer by a solvent evaporation method. These polymer alignment layers are formed by mixing a liquid crystal such as CPHOB (4-cyanophenyl 4'-hexyloxybenzoate), 50CB (4-cyano 4'-pentoxybiphenyl), 70CB (4-cyano 4'-heptoxybiphenyl), or HPPB (4-hexyloxyphenyl 4'-pentylbenzoate), with a polymer such as polyvinyl chloride, PMMA (polymethyl methacrylate), polystyrene, polydiisopropyl fumarate, acrylonitrile butadiene rubber or polyimide, applying the mixture onto the conductor films 20 and 60, and thereafter dipping these films in a solvent, such as ethanol or acetone, for example, dissolving only the liquid crystal, thereby extracting only the liquid crystal components. Portions of the films from which only the liquid crystal components are extracted are provided with a number of pores. In particular, fine textures are formed on the surfaces of the alignment layers 32 and 52. The sizes of the textures are set to be larger than the liquid crystal molecules and smaller than the pixel size, preferably in order of several $\mu$m. In the initial orientation state where the liquid crystal 40 is injected into a liquid crystal panel, the liquid crystal is injected into the textures provided on the surfaces of the alignment layers 32 and 52, more preferably also into the holes provided in the films. Due to such injection of the liquid crystal molecules into the textures of the surfaces, the liquid crystal molecules are dispersed in orientation along the texture shapes of the surfaces, and set at different pretilt angles respectively. When the liquid crystal is injected into the holes provided in the films, light scattering is caused when no voltage is applied across pixel electrodes, whereby an effect of improving light transmittance can be attained.

It is possible to control sizes or formation density of the textures provided on the alignment layers 32 and 52 by adjusting the mixing ratio of the liquid crystal to the polymer material for forming the alignment layers 32 and 52.

When the polymer material is prepared from ultraviolet setting resin or thermosetting resin, alignment layers having viscosity can be formed. Therefore, the substrates 10 and 70 and spacers can be fixed through the viscosity of the alignment layers 32 and 52.

Alternatively, the alignment layers 32 and 52 are made of foaming resin. In this case, expandable polystyrene resin, expandable polyethylene resin or expandable polyvinyl chloride resin is employed as a foaming resin material. The foaming resin material is applied onto the surfaces of the conductor films 20 and 60 so that foaming treatment is thereafter performed, whereby texture surfaces consisting of a number of pores can be formed at least on the surfaces of the alignment layers 32 and 52.

The surfaces of the alignment layers 32 and 52 which are formed by either one of the aforementioned methods are rubbed. However, this rubbing is not necessarily required.

While the textures are preferably formed on the surfaces of the alignment layers 32 and 52 which are arranged on both sides of the liquid crystal layer 40 respectively, only one of these films may alternatively be provided with a texture, to attain a similar effect.

Figure 22:
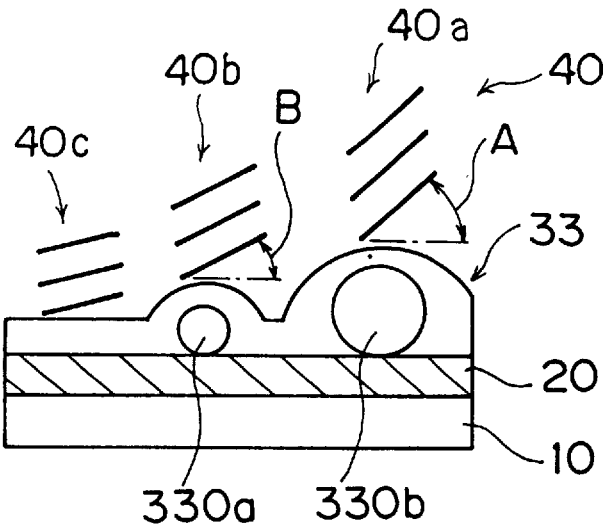
FIG. 22 is a sectional view showing a principal part of a liquid crystal display of another embodiment according to the seventh aspect of the present invention.

FIG. 22 is a sectional view showing a principal part of a liquid crystal display of another embodiment according to the seventh aspect of the present invention. This figure typically illustrates a region corresponding to one pixel. The liquid crystal display comprises a light-transmittable substrate 10 which is made of glass or light-transmittable synthetic resin, a conductor film 20 which is formed on the light-transmittable substrate 10, and an alignment layer 33 which is further formed thereon. A liquid crystal 40 is injected on the alignment layer 33. A structure (not shown) which is identical to that formed by the alignment layer 33, the conductor film 20 and the light-transmittable substrate 10 is symmetrically provided on the upper surface of the liquid crystal 40.

In this liquid crystal display, spacers 330*a* and 330*b* are mixed into the alignment layer 33, thereby forming a texture on its surface. The spacers 330*a* and 330*b* are formed by spherical spacers of silica, polystyrene resin, polyolefin resin or benzoguanamine resin. The spacers 330*a* and 330*b* may be uniform or varied in size. The spherical diameters of these spacers 330a and 330b are preferably in the range of 0.3 to 1.5 μm. According to this embodiment, the spherical spacers 330a and 330b have spherical diameters of 0.5 μm and 1.0 μm respectively, for example. The alignment layer 33 is formed by mixing the spherical spacers 330a and 330b into a solution of a polymer alignment layer material consisting of polyimide, polyamide, PVA, polyester or polyethylene, thereafter coating the surface of the conductor film 20 with this mixture by spin coating or printing, and heating the same. Thereafter rubbing is performed.

The alignment layer 33 which is formed in the aforementioned manner is provided on its surface with a texture along the shapes of the spherical spacers 330a and 330b which are dispersed on the surface of the conductor film 20. Therefore, liquid crystal molecules which are arranged on the texture surface are oriented at pretilt angles A and B which are varied with the shape of the texture surface. Referring to FIG. 22, for example, the pretilt angles are increased as convex portions are increased in size. Consequently, liquid crystal regions 40a, 40b and 40c having various pretilt angles are formed also in the pixel region shown in FIG. 22, whereby preferential viewing angles of the respective regions differ from each other so that wide viewing angles are attained as a whole.

Figure 23:
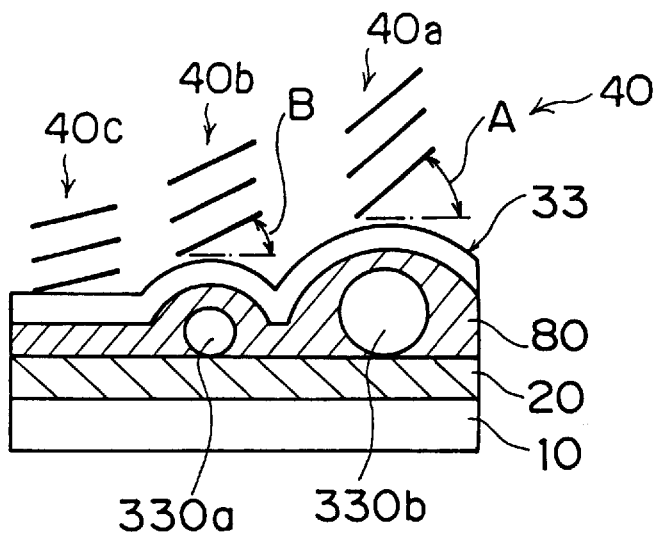
FIG. 23 is a sectional view showing a principal part of a liquid crystal display of still another embodiment according to the seventh aspect of the present invention.

FIG. 23 shows a modification of this embodiment. In a liquid crystal display according to this modification, an insulating film 80 is formed on a conductor film (transparent electrode) 20. Such an insulating film 80 is provided on each of surfaces which are opposed to each other through a liquid crystal layer 40, for preventing a pair of conductor films 20 from short-circuiting. In this liquid crystal display, spherical spacers 330a and 330b are mixed into each insulating film 80, to form a texture surface.

Namely, each insulating film 80 having a texture surface can be formed by spin coating, by mixing the spherical spacers 330a and 330b having different sizes into a coating solution for forming an $SiO_2$ film on each conductor film 20. Thereafter a polymer alignment layer 33 is formed on the surface of the insulating film 80. In this case, a texture shape is formed on a surface of the polymer alignment layer 33, along the texture shape provided on the surface of the insulating film 80. Thus, regions 40a to 40c having different pretilt angles can be formed similarly to the embodiment shown in FIG. 22.

The materials and the sizes for the spherical spacers 330a and 330b can be selected similarly to the embodiment shown in FIG. 22.

In each of the aforementioned embodiments and the modification according to the seventh aspect, the texture shape may be applied to either one or both of the pair of alignment layers (or insulating films) which are opposed to each other through the liquid crystal layer 40.

Figure 27:
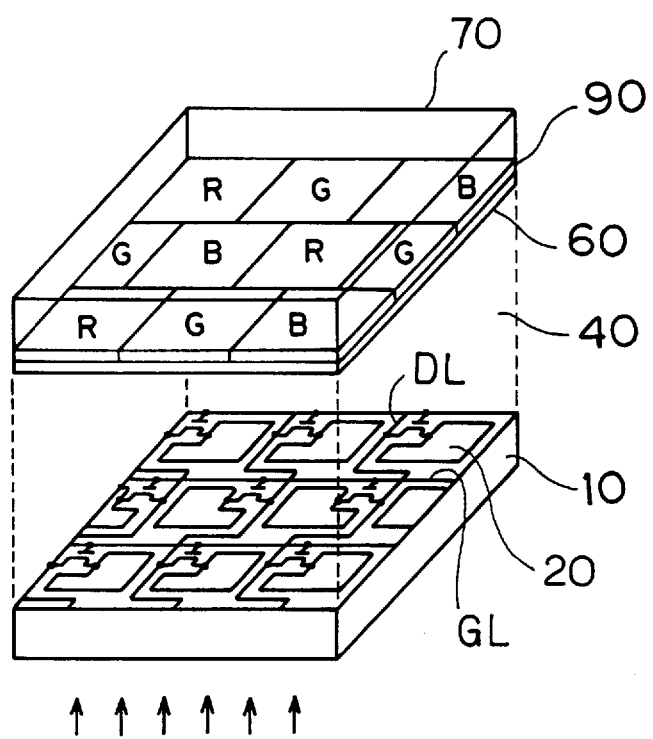
FIG. 27 is a perspective view showing a liquid crystal display panel of a further embodiment according to the seventh aspect of the present invention.

FIG. 27 is a perspective view typically showing the structure of a liquid crystal panel of still another embodiment according to the seventh aspect of the present invention. This liquid crystal panel comprises a pair of light-transmittable substrates 10 and 70 which are oppositely arranged through a liquid crystal 40, conductor films 20 and 60 defining a pair of counter electrodes which are formed on the light-transmittable substrates 10 and 70 respectively, and alignment layers (not shown) which are further formed on surfaces thereof. Further, a color filter 90 is provided on the light-transmittable substrate 70.

This liquid crystal display is characterized in that surfaces of the alignment layers are provided in shapes of cones or pyramids having inclined surfaces. FIGS. 28(a) to 30 show various exemplary shapes of alignment layers having inclined surfaces.

Figure 28A:
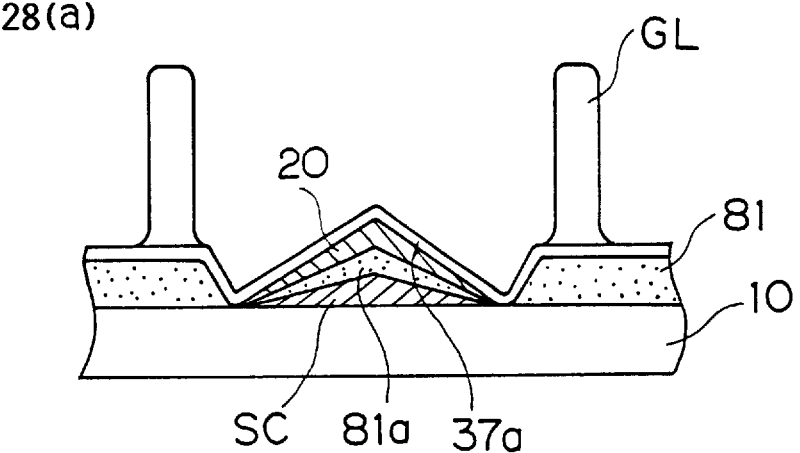
FIGS. 28(a) and 28(b) are sectional views showing a principal part of a liquid crystal display of a further embodiment according to the seventh aspect of the present invention.
Figure 28B:
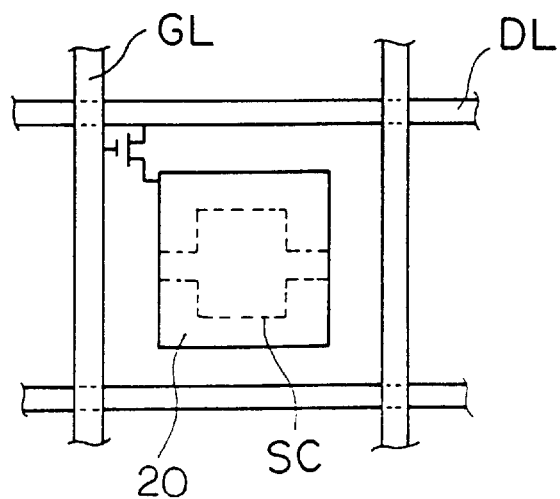

As shown in FIGS. 28(a) and 28(b), an auxiliary capacitive electrode SC is provided in the form of a cone or a pyramid in one pixel region which is partitioned by gate lines GL and data lines DL. An insulating film 81a, a conductor film 20 and an alignment layer 37a stacked on the auxiliary capacitive electrode SC have surfaces which are provided in the form of cones or pyramids along the surface shape of the auxiliary capacitive electrode SC respectively. The surface of the alignment layer 37a is rubbed in parallel with or at an angle of inclination of 45° with respect to the gate lines GL or the data lines DL.

Due to the aforementioned structure, regions of a liquid crystal provided on the surface of the alignment layer 37a are oriented at different pretilt angles along its inclined surface portions. Thus, preferential viewing angles of respective regions differ from each other, whereby wide viewing angles can be attained.

Figure 33:
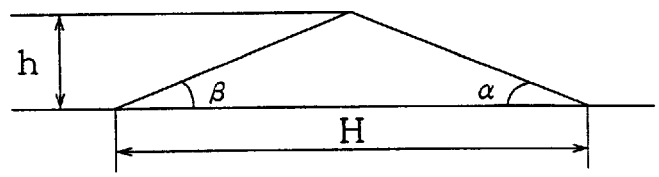
FIG. 33 illustrates the symbols in Table 2.

Table 2 shows relations between inclined surfaces of alignment layers and pretilt angles of liquid crystal regions provided on the inclined surfaces. The symbols in Table 2 are shown in FIG. 33.

TABLE 2

| Size (H × H) μm | Height h (μm) | Angle of Inclination (α = β) Deg. | Difference in Pretilt Angle (α = β) Deg. |
| --- | --- | --- | --- |
| 50 × 50 | 1 | 2.3 | 4.6 |
| 50 × 50 | 0.5 | 1.15 | 2.3 |
| 100 × 100 | 0.5 | 0.58 | 1.15 |

As clearly understood from Table 2, the liquid crystal regions are oriented at different pretilt angles in response to the angles of inclination of the inclined surfaces.

Figure 29:
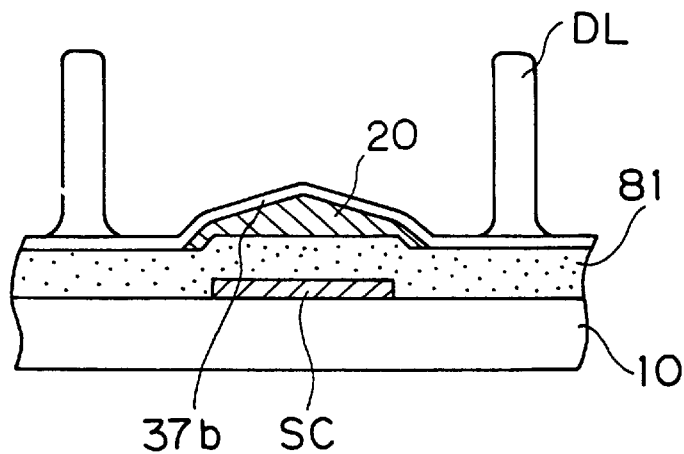
FIG. 29 is a sectional view showing a principal part of a liquid crystal display of a further embodiment according to the seventh aspect of the present invention.

Referring to FIG. 29, on the other hand, only a pixel electrode (conductor film) 20 is provided in the form of a pyramid having inclined surface portions. Therefore, an alignment layer 37b which is provided thereon is also provided in the form of a pyramid, along the surface shape of the pixel electrode 20.

Figure 30:
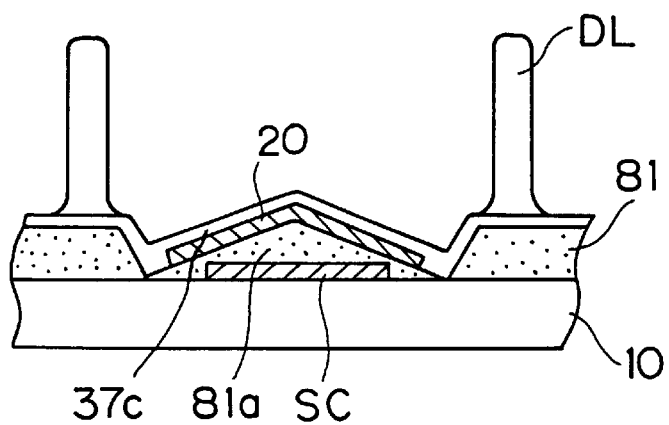
FIG. 30 is a sectional view showing a principal part of a liquid crystal display of a further embodiment according to the seventh aspect of the present invention.

Referring to FIG. 30, an insulating film 81a which is stacked between an auxiliary capacitive electrode SC and a pixel electrode 20 is provided in the form of a pyramid similarly to the aforementioned embodiments, and the pixel electrode 20 and an alignment layer 37c which are formed on its surface are also provided in the form of pyramids along its surface shape.

In every one of the embodiments shown in FIGS. 28(a) to 30, the alignment layer is provided in the form of a pyramid having inclined surface portions, whereby liquid crystal regions can be oriented at pretilt angles which are varied with the inclined surface portions.

Each of the auxiliary capacitive electrode SC, the insulating film 81 and the pixel electrode 20 is tapered after film formation by taper etching, which can be selected from the following methods:

For example, a first method is adapted to adjust an etching selection ratio of an etching mask to an etched film is so adjusted that the etching mask is side-etched in the etching process and the etching progresses with retraction of side surfaces, thereby taper-etching side surfaces of the etched film.

A second method utilizes a multistage etching process. This method is adapted to alternately repeat formation of an etched film and etching for gradually narrowing an etching mask width, thereby stacking the etched film in the form of a pyramid.

A third method utilizes formation of polymerization films on side walls. This method is adapted to carry out etching while mixing a polymerization film forming component into a reactive gas for dry etching or the like, thereby forming polymerization films on side walls of an etching mask in the etching process and tapering side surfaces of an etched film by spreading the mask width.

The pyramidal surface shape having inclined surfaces through taper etching may be formed in the units of pixels as shown in each of FIGS. 28(a) to 30, or may be formed in wider regions beyond single pixel regions. Further, the same may be formed not only on the respective layers on the pixel electrode 20 side but on a conductor film and an insulating film provided on a counter electrode side. Further, the same may be formed on respective layers of both sides which are opposite to each other.

Figure 31:
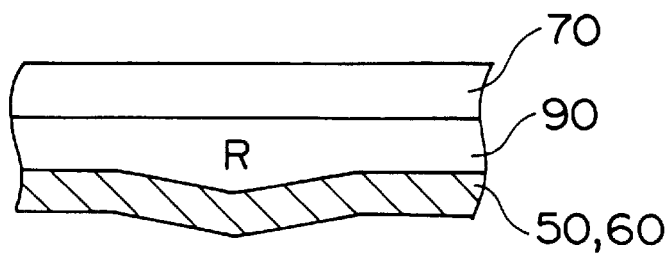
FIG. 31 is a sectional view showing a principal part of a liquid crystal display of a further embodiment according to the seventh aspect of the present invention.

In addition, a pyramidal inclined surface may be formed on a color filter 90, as shown in FIG. 31. Further, the surface shape may be provided in the form of a truncated cone or a truncated pyramid, in place of the cone or the pyramid.

Figure 32:
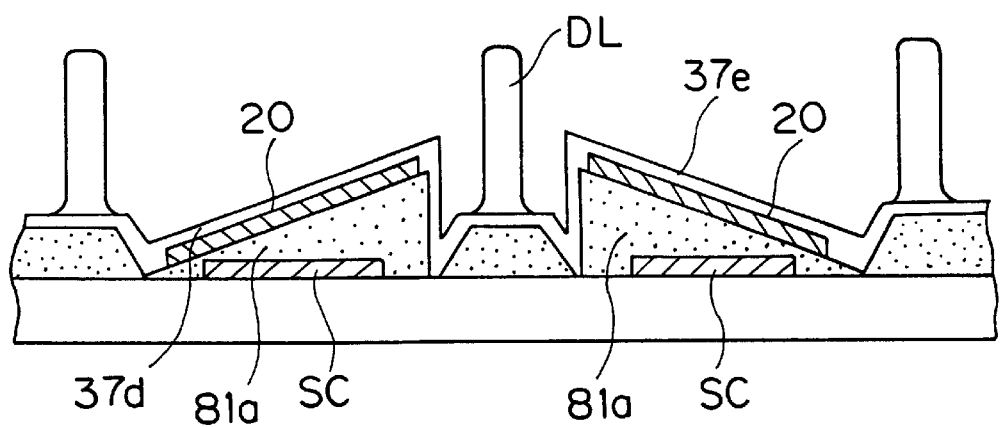
FIG. 32 is a sectional view showing a principal part of a liquid crystal display of a further embodiment according to the seventh aspect of the present invention.

FIG. 32 is a sectional view showing a further embodiment according to the seventh aspect. In this embodiment, one pyramidal convex portion is formed in adjacent four pixels. Therefore, alignment layers 37d and 37e are formed to be raised toward a central data line DL, as shown in FIG. 32. According to this embodiment, insulation films 81a of respective pixels are formed to have inclined surfaces, whereby the alignment layers 37d and 37e which are formed thereon are inclined. Thus, the tapered convex portions of the alignment layers may not necessarily be formed in one pixel, but one tapered convex portion may alternatively be formed in a plurality of adjacent pixel regions.

Although the alignment layer is inclined by forming an inclined surface in the insulation film in the above embodiment, the alignment layer may be inclined by forming an inclined surface in the pixel electrode or the auxiliary capacitive electrode.

An embodiment according to the eighth aspect of the present invention is now described.

Figure 24:
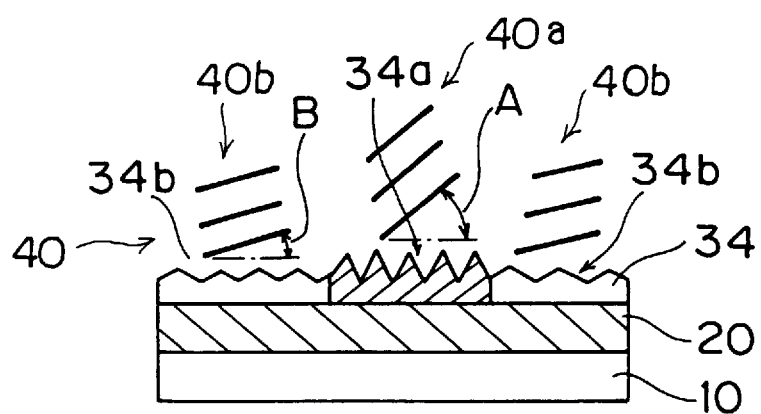
FIG. 24 is a sectional view showing a principal part of a liquid crystal display of an embodiment according to an eighth aspect of the present invention.

FIG. 24 is a sectional view showing a principal part of a liquid crystal display of the embodiment according to the eighth aspect of the present invention. This figure typically shows the structure of a region corresponding to one pixel. This liquid crystal display comprises a light-transmittable substrate 10 which is made of glass or light-transmittable synthetic resin, a conductor film 20 which is formed on the light-transmittable substrate 10, and an alignment layer 34 which is further formed thereon. A liquid crystal 40 is injected on the alignment layer 34. A structure (not shown) which is identical to that formed by the alignment layer 34, the conductor film 20 and the light-transmittable substrate 10 is symmetrically provided on the upper surface of the liquid crystal 40.

In this liquid crystal display, microgroove regions 34a and 34b having different shapes are formed on the surface of the alignment layer 34. The microgroove regions 34a and 34b are provided with substantially V-shaped plural grooves along the surface of the alignment layer 34. The pitches, depths, widths and directions of extension of the grooves are varied with the regions 34a and 34b. When such microgroove regions 34a and 34b having different shapes are thus formed on the surface of the alignment layer 34, the liquid crystal 40 is so oriented that pretilt angles of its regions differ from each other in an initial orientation state. In the region 34a having higher groove formation density, for example, the pretilt angle A is larger than the pretilt angle B in the regions 34b having relatively lower groove formation density (A>B). Thus, it is possible to attain wide viewing angles by forming various regions having different preferential viewing angles in correspondence to the different pretilt angles.

A method of forming the microgroove regions 34a and 34b can be selected from the following methods:

A first method employs shape transfer. This method is adapted to first prepare a metal plate etc. having desired microgroove shapes which are worked on its surface, and to press the worked surface of this metal plate against the surface of the alignment layer 34 while heating the same if necessary, thereby transferring the microgroove shapes from the surface of the metal plate to that of the alignment layer 34. For example, microgroove regions having different groove depths in the range of 100 to 500Å and different groove pitches in the range of 0.1 to 5 µm are transferred to and formed on the surface of the alignment layer 34 of 1000 to 1500Å in thickness. The alignment layer 34 is prepared from a material having flexibility allowing shape transfer, such as polyimide, PVA, polyamide, polyester or polyethylene, for example.

A second method is adapted to directly work the surface of the alignment layer 34 with a laser beam, thereby forming microgroove shapes.

Figure 25:
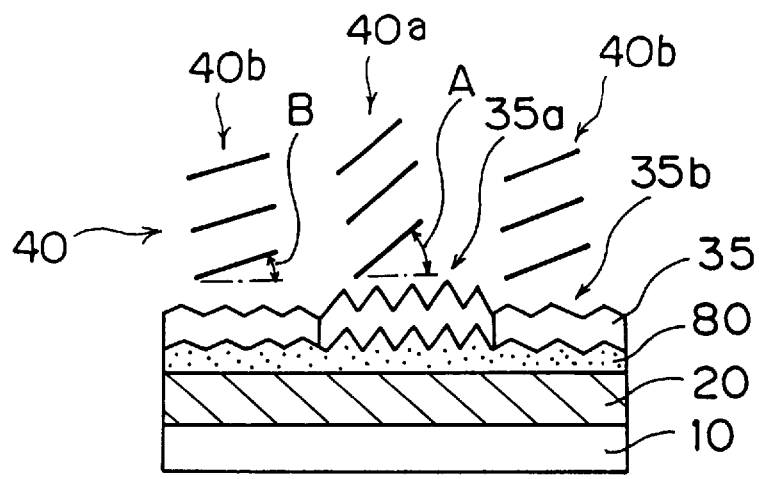
FIG. 25 is a sectional view showing a principal part of a liquid crystal display of another embodiment according to the eighth aspect of the present invention.

A modification is now described. FIG. 25 is a sectional view showing a principal part of a liquid crystal display according to the modification. In this modification, an insulating film 80 is formed between a conductor film 20 and an alignment layer 35, so that microgroove regions are formed on the surface of the insulating film 80, in the following manner:

First, an $SiO_2$ film 80 is formed in a thickness of 1000 to 2000Å on the surface of the conductor film 20 by sputtering, for example. Then, various microgroove regions having different groove shapes are formed on the surface of the $SiO_2$ film by shape transfer, similarly to the above. Thereafter the alignment layer 35 is formed on the surface of the insulating film 80, whereby microgroove shapes are formed on its surface along those on the surface of the insulating film 80. In this case, the alignment layer 35 is formed in a thickness of about 100 to 1000Å, for example, allowing reflection of the microgroove shapes of the insulating film 80, by spin coating or printing.

Figure 26:
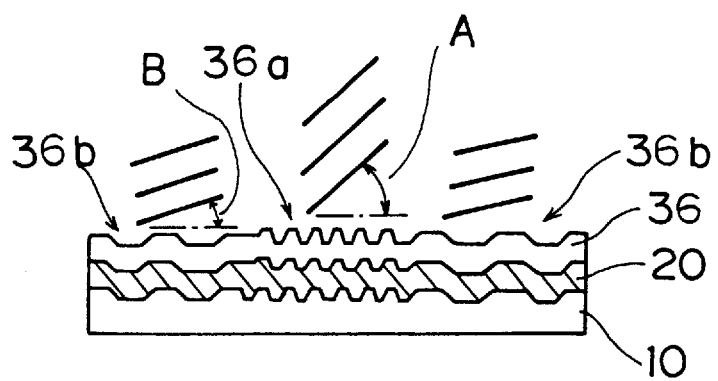
FIG. 26 is a sectional view showing a principal part of a liquid crystal display of still another embodiment according to the eighth aspect of the present invention.

Another modification is described with reference to FIG. 26. In the modification shown in FIG. 26, microgroove shapes are formed on the surface of a light-transmittable substrate 10.

The groove shapes can be formed on the surface of the light-transmittable substrate 10 by etching. For example, a resist film having groove shape patterns to be formed on the surface of the light-transmittable substrate 10 is formed and subjected to wet etching with dilute hydrofluoric acid ($HF:H_2O=1:50$), whereby grooves which are responsive to the resist patterns are formed on the surface of the light-transmittable substrate 10. The depths of the grooves are controlled to about 100 to 1000Å, for example, by adjusting the etching time. Alternatively, plasma dry etching in an atmosphere of carbon tetrafluoride and oxygen may be employed in place of wet etching, to form grooves similarly to the above.

When a conductor film 20, an insulating film, if necessary, and an alignment layer 36 are successively formed on the substrate 10 having the grooves formed by etching, the surfaces of the respective films are provided with groove shapes reflecting those on the surface of the light-transmittable substrate 10.

The groove shapes may be formed not only on the alignment layer 36, the insulating film and the light-transmittable substrate 10 but on those provided on an opposite side. The microgroove regions having different groove shapes can be set as shown in FIGS. 7(*a*), 7(*b*), 8(*a*), 8(*b*) and 10 to 15 described with reference to the first to fourth aspects. Further, the same are not restricted to one pixel region, but region setting shown in FIG. 9, for example, is possible.

As to the microgroove shapes formed on the alignment layer, the insulating film and/or the light-transmittable substrate, uniform groove shapes may be formed on the overall surface of a display region. Also in this case, liquid crystal regions have different pretilt angles in an initial orientation state along the groove shapes of the alignment layer along the microgroove shapes, whereby the viewing angles can be increased through various preferential viewing angles.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal display comprising:
   a liquid crystal; and
   a polyimide alignment layer for orienting said liquid crystal,
   said polyimide alignment layer having a plurality of regions being at different imidiation ratios, thereby orienting portions of said liquid crystal corresponding to respective said regions at different pretilt angles responsive to said imidiation ratios.

2. The liquid crystal display in accordance with claim 1, wherein said plurality of regions of said polyimide alignment layer being at different imidiation ratios are formed in each pixel.

3. A method of preparing a liquid crystal display having a polyimide alignment layer for orienting a liquid crystal, comprising the steps of:
   forming said polyimide alignment layer;
   prebaking said polyimide alignment layer; and
   irradiating said polyimide alignment layer with a laser beam, thereby changing an imidiation ratio of the irradiated region.

4. The method of preparing a liquid crystal display in accordance with claim 3, wherein said polyimide alignment layer in made from polyamic acid.

5. The method of preparing a liquid crystal display in accordance with claim 3, wherein said polyimide alignment layer in made from soluble polyimide.

6. The method of preparing a liquid crystal display in accordance with claim 3, wherein the temperature for heat treatment in said prebaking step is 50 to 150° C.

7. The method of preparing a liquid crystal display in accordance with claim 6, wherein said prebaking step is carried out through irradiation with a laser beam.

8. The method of preparing a liquid crystal display in accordance with claim 7, wherein said laser beam is at least 400 nm in wavelength.

9. The method of preparing a liquid crystal display in accordance with claim 3, wherein said step of irradiating said polyimide alignment layer with a laser beam comprises a step of increasing said imidiation ratio of said irradiated region.

10. The method of preparing a liquid crystal display in accordance with claim 9, wherein said laser beam for increasing said imidiation ratio is at least 400 nm in wavelength.

11. The method of preparing a liquid crystal display in accordance with claim 3, wherein said step of irradiating said polyimide alignment layer with a laser beam comprises a step of reducing said imidiation ratio of said irradiated region.

12. The method of preparing a liquid crystal display in accordance with claim 11, wherein said laser beam being applied for reducing said imidiation ratio is a laser beam of 300 to 400 nm in wavelength.

* * * * *